United States Patent
Melone et al.

(10) Patent No.: US 12,463,470 B2
(45) Date of Patent: Nov. 4, 2025

(54) SLOTTED FOREIGN OBJECT DETECTION DURING WIRELESS POWER TRANSFER

(71) Applicant: NuCurrent, Inc., Chicago, IL (US)

(72) Inventors: Mark Melone, Frankfort, IL (US); Alberto Peralta, Chicago, IL (US); Michael Katz, Glen Ellyn, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 19/195,504

(22) Filed: Apr. 30, 2025

(65) Prior Publication Data

US 2025/0260268 A1 Aug. 14, 2025

Related U.S. Application Data

(63) Continuation of application No. 18/778,080, filed on Jul. 19, 2024, which is a continuation of application
(Continued)

(51) Int. Cl.
*H02J 50/12* (2016.01)
*H02J 50/40* (2016.01)
(Continued)

(52) U.S. Cl.
CPC .......... *H02J 50/60* (2016.02); *H02J 50/402* (2020.01); *H02J 50/80* (2016.02)

(58) Field of Classification Search
CPC .......... H02J 50/10; H01F 38/14; B60L 53/12; B60L 53/34
See application file for complete search history.

(56) References Cited

U.S. PATENT DOCUMENTS

| | | |
|---|---|---|
| 3,761,668 A | 9/1973 | Harnden, Jr. et al. |
| 3,814,888 A | 6/1974 | Bowers et al. |
| (Continued) | | |

FOREIGN PATENT DOCUMENTS

| | | |
|---|---|---|
| KR | 20180006176 A | 1/2018 |
| WO | 2013130337 A1 | 9/2013 |
| WO | 2017126110 A1 | 7/2017 |

OTHER PUBLICATIONS

EP Extended Search Report, EP Application No. 22753280.1, dated Feb. 26, 2025, 26 pages.
(Continued)

*Primary Examiner* — Rexford N Barnie
*Assistant Examiner* — Esayas G Yeshaw
(74) *Attorney, Agent, or Firm* — Lee Sullivan Shea & Smith LLP

(57) ABSTRACT

A wireless power transmitter is configured to (i) detect a presence of a wireless power receiver that is couplable with the wireless power transmitter, (ii) after detecting the presence of the wireless power receiver, initiate wireless power transfer with the wireless power receiver, (iii) detect that a given amount of time has elapsed since a prior reference point, (iv) in response to detecting that the given amount of time has elapsed since the prior reference point, (a) pause the wireless power transfer with the wireless power receiver for a temporary period of time and (b) after the wireless power transfer is paused, perform a foreign object detection (FOD) process during the temporary period of time, and (v) after the FOD process is completed, resume the wireless power transfer with the wireless power receiver.

20 Claims, 19 Drawing Sheets

Related U.S. Application Data

No. 18/341,513, filed on Jun. 26, 2023, now Pat. No. 12,046,924, which is a continuation of application No. 17/707,702, filed on Mar. 29, 2022, now Pat. No. 11,689,063, which is a continuation of application No. 17/172,922, filed on Feb. 10, 2021, now Pat. No. 11,289,952.

(51) Int. Cl.
  *H02J 50/60* (2016.01)
  *H02J 50/80* (2016.01)

(56) References Cited

U.S. PATENT DOCUMENTS

| | | |
|---|---|---|
| 6,141,392 A | 10/2000 | Hoshikuki et al. |
| 8,159,090 B2 | 4/2012 | Greene et al. |
| 9,508,487 B2 | 11/2016 | Von Novak et al. |
| 10,205,351 B2 | 2/2019 | Lee |
| 10,211,663 B2 | 2/2019 | Matsuyuki et al. |
| 10,333,333 B2 | 6/2019 | Ritter et al. |
| 10,424,940 B2 | 9/2019 | Nam et al. |
| 10,454,309 B2 | 10/2019 | Byun |
| 10,536,035 B2 | 1/2020 | Joye et al. |
| 10,608,475 B2 | 3/2020 | Bae et al. |
| 10,637,295 B2 | 4/2020 | Mao |
| 10,658,869 B2 | 5/2020 | Muratov et al. |
| 10,778,046 B2 | 9/2020 | Ikefuji et al. |
| 10,892,800 B1 | 1/2021 | Katz |
| 10,978,246 B2 | 4/2021 | Bae |
| 10,978,921 B1 | 4/2021 | Wang et al. |
| 10,985,465 B2 * | 4/2021 | Singh ............ H04B 5/26 |
| 11,038,376 B2 | 6/2021 | Hemphill et al. |
| 11,081,911 B1 | 8/2021 | Nalbant et al. |
| 11,223,241 B2 | 1/2022 | Ogura |
| 11,515,738 B2 | 11/2022 | Louis et al. |
| 11,515,839 B2 | 11/2022 | Lazaro |
| 11,735,962 B2 | 8/2023 | Schwartz et al. |
| 11,764,621 B1 | 9/2023 | Hu et al. |
| 11,784,512 B2 | 10/2023 | Narayanan et al. |
| 11,997,836 B1 | 5/2024 | Thirumalai Ananthan Pillai et al. |
| 2007/0076459 A1 | 4/2007 | Limpkin |
| 2010/0034238 A1 | 2/2010 | Bennett |
| 2010/0284208 A1 | 11/2010 | Nguyen et al. |
| 2011/0114401 A1 | 5/2011 | Kanno |
| 2011/0127845 A1 | 6/2011 | Walley |
| 2011/0127951 A1 | 6/2011 | Walley et al. |
| 2011/0281539 A1 | 11/2011 | Yamada |
| 2011/0315496 A1 | 12/2011 | Bohori et al. |
| 2012/0200169 A1 | 8/2012 | Urano |
| 2012/0235507 A1 | 9/2012 | Choi et al. |
| 2012/0261405 A1 | 10/2012 | Kurose et al. |
| 2012/0306284 A1 | 12/2012 | Lee et al. |
| 2012/0313445 A1 | 12/2012 | Park et al. |
| 2012/0319479 A1 | 12/2012 | Covic et al. |
| 2014/0125139 A1 | 5/2014 | Wang et al. |
| 2014/0241555 A1 | 8/2014 | Terlizzi |
| 2014/0306546 A1 | 10/2014 | Jansen et al. |
| 2014/0339906 A1 | 11/2014 | Miyamoto et al. |
| 2014/0339907 A1 | 11/2014 | Omae et al. |
| 2014/0339908 A1 | 11/2014 | Omae et al. |
| 2015/0115727 A1 | 4/2015 | Carobolante et al. |
| 2015/0145345 A1 | 5/2015 | Long et al. |
| 2015/0357827 A1 | 12/2015 | Muratov et al. |
| 2015/0371771 A1 | 12/2015 | Abu Qahouq |
| 2016/0036241 A1 | 2/2016 | Eckerson et al. |
| 2016/0079763 A1 | 3/2016 | Lee et al. |
| 2016/0226310 A1 * | 8/2016 | Muratov ............ H01F 27/363 |
| 2016/0372961 A1 | 12/2016 | Ritter et al. |
| 2017/0005399 A1 | 1/2017 | Ito et al. |
| 2017/0018936 A1 | 1/2017 | Muratov et al. |
| 2017/0085133 A1 | 3/2017 | Byun |
| 2017/0170688 A1 * | 6/2017 | Maniktala ............ H01F 38/14 |
| 2017/0237296 A1 | 8/2017 | Keith et al. |
| 2017/0279282 A1 | 9/2017 | Nam et al. |
| 2017/0279313 A1 | 9/2017 | Hu et al. |
| 2017/0302097 A1 | 10/2017 | Kim et al. |
| 2017/0310164 A1 | 10/2017 | Abdolkhani et al. |
| 2017/0324283 A1 | 11/2017 | Walton |
| 2017/0338695 A1 | 11/2017 | Port |
| 2018/0013313 A1 | 1/2018 | Lee et al. |
| 2018/0034324 A1 | 2/2018 | Abdolkhani |
| 2018/0041066 A1 | 2/2018 | Vijayan et al. |
| 2018/0054089 A1 | 2/2018 | Lee et al. |
| 2018/0123392 A1 | 5/2018 | Pinciuc et al. |
| 2018/0123646 A1 | 5/2018 | Onishi |
| 2018/0123843 A1 | 5/2018 | Teichmann et al. |
| 2018/0233942 A1 | 8/2018 | Qiu et al. |
| 2018/0233954 A1 | 8/2018 | Yang et al. |
| 2018/0233956 A1 | 8/2018 | Moussaoui et al. |
| 2018/0248408 A1 | 8/2018 | Chen |
| 2018/0309327 A1 | 10/2018 | Miyamoto et al. |
| 2018/0316391 A1 | 11/2018 | Hijikata |
| 2019/0013703 A1 | 1/2019 | Shichino |
| 2019/0028148 A1 | 1/2019 | Louis |
| 2019/0123784 A1 | 4/2019 | Forster |
| 2019/0215203 A1 * | 7/2019 | Zoescher ............ H04B 5/77 |
| 2019/0222259 A1 | 7/2019 | Mazumder et al. |
| 2019/0247669 A1 | 8/2019 | Nielsen et al. |
| 2019/0260238 A1 | 8/2019 | Cho et al. |
| 2019/0288557 A1 * | 9/2019 | Leem ............ H02J 50/10 |
| 2019/0296588 A1 * | 9/2019 | Muratov ............ H02J 50/40 |
| 2019/0305591 A1 | 10/2019 | Ng et al. |
| 2019/0305595 A1 | 10/2019 | Mantha et al. |
| 2019/0326769 A1 | 10/2019 | Kanakasabai et al. |
| 2019/0341969 A1 | 11/2019 | Onishi |
| 2020/0021114 A1 | 1/2020 | Nam et al. |
| 2020/0153283 A1 | 5/2020 | Kanakasabai et al. |
| 2020/0176990 A1 | 6/2020 | Bhat et al. |
| 2020/0220387 A1 | 7/2020 | Zeine et al. |
| 2020/0244174 A1 | 7/2020 | Kanakasabai et al. |
| 2020/0244236 A1 | 7/2020 | Hwang et al. |
| 2020/0389058 A1 | 12/2020 | Boulanger et al. |
| 2021/0012176 A1 | 1/2021 | Freitas et al. |
| 2021/0281119 A1 * | 9/2021 | Bhandarkar ......... H02J 50/402 |
| 2021/0281122 A1 | 9/2021 | Aldhaher |
| 2022/0103992 A1 | 3/2022 | Tramoni |
| 2022/0216738 A1 | 7/2022 | Yang et al. |
| 2022/0271571 A1 | 8/2022 | Yang et al. |
| 2022/0407369 A1 | 12/2022 | Hu et al. |
| 2023/0370115 A1 | 11/2023 | Schwartz et al. |
| 2023/0378822 A1 | 11/2023 | Abukhalaf et al. |
| 2023/0420998 A1 | 12/2023 | Terry et al. |

OTHER PUBLICATIONS

International Searching Authority, PCT International Search Report and Written Opinion, PCT International Application No. PCT/US2022/015841 dated Jun. 13, 2022, 9 pages.

QI Specification: MPP System Specification and MPP Communications Protocol, Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 268 pages.

QI Specification, Wireless Power Consortium [online], Version 1.3, Jan. 2021, [retrieved May 21, 2024], Retrieved from the Internet: URL: https://www.wirelesspowerconsortium.com/knowledge-base/specifications/download-the-qi-specifications/, 746 pages.

QI Specification, Wireless Power Consortium [online], Version 2.0, Apr. 2023, [retrieved Jan. 22, 2025], Retrieved from the Internet: URL: https://www.wirelesspowerconsortium.com/knowledge-base/specifications/download-the-qi-specifications, 664 pages.

* cited by examiner

SLOTTED FOREIGN OBJECT DETECTION DURING WIRELESS POWER TRANSFER

CROSS-REFERENCE TO RELATED APPLICATIONS

This application is a continuation of, and claims priority to, U.S. Non-Provisional application Ser. No. 18/778,080, filed Jul. 19, 2024, and entitled "SLOTTED COMMUNICATIONS IN VIRTUAL AC POWER SIGNAL TRANSFER WITH VARIABLE SLOT WIDTH," which, in turn, is a continuation of, and claims priority to, U.S. Non-Provisional application Ser. No. 18/341,513, filed Jun. 26, 2023, and entitled "SLOTTED COMMUNICATIONS IN VIRTUAL AC POWER SIGNAL TRANSFER WITH VARIABLE SLOT WIDTH," which, in turn, is a continuation of, and claims priority to, U.S. Non-Provisional application Ser. No. 17/707,702, filed Mar. 29, 2022, issued as U.S. Pat. No. 11,689,063, and entitled "SLOTTED COMMUNICATIONS IN VIRTUAL AC POWER SIGNAL TRANSFER WITH VARIABLE SLOT WIDTH," which, in turn, is a continuation of, and claims priority to, U.S. Non-Provisional application Ser. No. 17/172,922, filed Feb. 10, 2021, issued as U.S. Pat. No. 11,289,952, and entitled "SLOTTED COMMUNICATIONS IN VIRTUAL AC POWER SIGNAL TRANSFER WITH VARIABLE SLOT WIDTH," the contents of each of which are incorporated herein by reference in its entirety.

TECHNICAL FIELD

The present disclosure generally relates to systems and methods for wireless transfer of electrical power, and, more particularly, to wireless transfer of virtual AC power signals.

BACKGROUND

Wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When using such a wireless connection system to wirelessly power a device, a direct current (DC) power input may be generated at a rectifier of the receiving element, which may have a voltage comparable to power output of, for example, a USB port (e.g., typically about 0.5 Watts (W) to about 50 W). However, a variety of devices exist (e.g., electronic devices such as appliances) that are more suitably powered by an alternating current (AC) power input from a standard AC wall outlet and components thereof. Such devices may include, but are not limited to including, high powered devices (e.g., kitchen appliances, power tools, among other things) and/or devices utilizing AC motors that are optimized for receiving an AC power input.

SUMMARY

Accordingly, systems, devices, and methods for wireless power transfer are desired that can simulate the power transfer from an AC wall outlet (or the like) to a device for which AC power input is more suitable, including but not limited to an electronic device such as an appliance. To that end, disclosed herein are systems, devices, and methods that provide "virtual AC power signals" via a wireless power transfer system, to power such devices (e.g., kitchen appliances, power tools, among other AC powered machines, particularly those with AC motors). Additionally or alternatively, AC power input can be useful at high power levels (e.g., of about 500 W to about 5 kiloWatts (kW)), because the alternating voltage can lower a peak current flow, over time, and lower peak currents result in less heat generated and/or result in less loss in efficiency, due to resistance in the signal path. Virtual AC power signals, generally, are wireless power signals that simulate characteristics of AC power input from, for example, but not limited to, a conventional power outlet.

The systems and methods disclosed herein are particularly beneficial when used to power devices that require high power levels, while also providing some data communications during, before, or after transfer of virtual AC power signals. For example, such data communications may be necessary for controlling devices powered by AC power signals. However, due to the high power levels that may be produced by the virtual AC power signals (e.g., due to the "virtual AC" rise and fall of said signals), particular modes of wireless data communications may be unavailable or unideal (e.g., in-band communications of the virtual AC power signal). Further, other modes of wireless data communication may require additional circuitry, which may be cost prohibitive or not suitable for the given application (e.g., a Bluetooth communications system, a WiFi communications system).

To address this need, the systems, devices, and methods disclosed herein may also be capable of performing another wireless power transfer, which may include in-band data communications, in addition to the virtual AC power signal transfer. This additional wireless power transfer may provide a more traditional, "virtual direct current (DC) power signal" to the receiver element, which is generally transferred at a higher operating frequency, in comparison to the operating frequency of transfer for virtual AC power signals, and may also generally (but not necessarily) have a lower peak power or voltage level than the virtual AC power signal.

In some such examples, the additional virtual DC power signal may be of a lower power level (e.g., in a range of about 1 mW to about 15 W), when compared to the virtual AC power signal (e.g., in a range of about 50 W to about 5 kW). In such examples, the receiving element may include one or more subsystems that are capable of being powered by such a lower power level signal. Thus, prior to using (or as an alternative to using) the virtual DC power signal for in-band data communications, the virtual DC power signal may be utilized to power components and/or devices of the receiving element. For example, while receiving power input from the systems, devices, and methods disclosed herein, a device such as an appliance could utilize the virtual DC power signal to power up a lower-power component such as a controller or control mechanism, which is utilized to turn the device's higher-power components (e.g., a motor) on or off, thus, in some examples, communicating to the transmitter element that virtual AC power signals are desired for powering the higher-power components and/or facilitating receipt of the AC power signals by the higher-power components.

In accordance with the present disclosure, the virtual DC power signal transmitting system/sub-system may be a high frequency wireless power system, utilized for one or both of communicating with a receiver element and providing additional, virtual DC power signals to the receiver element, prior to, during, and/or after transmission of AC power signals.

The systems, devices, and methods disclosed herein may be implemented by including a new high frequency wireless power system, which include new circuits for allowing higher power transfer (greater than 300 mW) than legacy devices, without damaging circuitry and/or without degrading communications below a desired standard data protocol, are desired.

Wireless transmission systems disclosed herein may include a damping circuit, which is configured for damping an AC wireless signal during transmission of the AC wireless signal and associated data signals. The damping circuit may be configured to reduce rise and fall times during OOK signal transmission, such that the rate of the data signals may not only be compliant and/or legible but may also achieve faster data rates and/or enhanced data ranges, when compared to legacy systems.

Damping circuits of the present disclosure may include one or more of a damping diode, a damping capacitor, a damping resistor, or any combinations thereof for further enhancing signal characteristics and/or signal quality.

In some embodiments wherein the damping circuit includes the damping resistor, the damping resistor is in electrical series with the damping transistor and has a resistance value (ohms) configured such that it dissipates at least some power from the power signal. Such dissipation may serve to accelerate rise and fall times in an amplitude shift keying signal, an OOK signal, and/or combinations thereof.

In some such embodiments, the value of the damping resistor is selected, configured, and/or designed such that the damping resistor dissipates the minimum amount of power to achieve the fastest rise and/or fall times in an in-band signal allowable and/or satisfy standards limitations for minimum rise and/or fall times; thereby achieving data fidelity at maximum efficiency (less power lost to resistance) as well as maintaining data fidelity when the system is unloaded and/or under lightest load conditions.

In some embodiments wherein the damping circuit includes the damping capacitor, the damping capacitor may be configured to smooth out transition points in an in-band signal and limit overshoot and/or undershoot conditions in such a signal.

In some embodiments wherein the damping circuit includes the damping diode, the diode is positioned such that a current cannot flow out of the damping circuit, when a damping transistor is in an off state. Thus, the diode may prevent power efficiency loss in an AC power signal when the damping circuit is not active.

The wireless receiver systems disclosed herein utilize a voltage isolation circuit, which may have the capability to achieve proper data communications fidelity at greater receipt power levels at the load, when compared to other high frequency wireless power transmission systems. To that end, the wireless receiver systems, with the voltage isolation circuits, are capable of receiving power from the wireless transmission system that has an output power at levels over 1 W of power, whereas legacy high frequency systems may be limited to receipt from output levels of only less than 1 W of power.

For example, in legacy NFC-DC systems, the poller (receiver system) often utilizes a microprocessor from the NTAG family of microprocessors, which was initially designed for very low power data communications. NTAG microprocessors, without protection or isolation, may not adequately and/or efficiently receive wireless power signals at output levels over 1 W. However, inventors of the present application have found, in experimental results, that when utilizing voltage isolation circuits as disclosed herein, the NTAG chip may be utilized and/or retrofitted for wireless power transfer and wireless communications, either independently or simultaneously.

To that end, the voltage isolation circuits disclosed herein may utilize inexpensive components (e.g., isolation capacitors) to modify functionality of legacy, inexpensive microprocessors (e.g., an NTAG family microprocessor), for new uses and/or improved functionality. Further, while alternative controllers may be used as the receiver controller 38 that may be more capable of receipt at higher voltage levels and/or voltage swings, such controllers may be cost prohibitive, in comparison to legacy controllers. Accordingly, the systems and methods herein allow for use of less costly components, for high power high frequency wireless power transfer.

In accordance with one aspect of the disclosure, a wireless power transmission system is disclosed. The wireless power transmission system includes a first transmission antenna, a second transmission antenna, at least one transmission controller, a first transmission power conditioning system, and a second transmission power conditioning system. The first transmission antenna is configured to couple with a first receiver antenna and transmit virtual AC power signals to the first receiver antenna. The second transmission antenna is configured to couple with a second receiver antenna and transmit virtual direct current (DC) power signals to the second receiver antenna. The at least one transmission controller is configured to determine a variable slot length ($t_{Slot}$) for slotted communications, determine a first driving signal for driving the first transmission antenna based on a first operating frequency, a virtual AC power frequency, the variable slot length, and a slot timing, provide the first driving signal, determine a second driving signal for driving the second transmission antenna based on a second operating frequency, the variable slot length, and the slot timing, and provide the second driving signal. The first transmission power conditioning system includes at least one first transistor that is configured to receive the first driving signal, at a gate of the at least one first transistor, and to receive a first input power signal to generate the virtual AC power signals at the first operating frequency, the virtual AC power signals having peak voltages rising and falling based on the virtual AC power frequency. The second transmission power conditioning system includes at least one second transistor that is configured to receive the second driving signal, at a gate of the at least one second transistor, and to receive a second input power signal to generate the virtual DC power signals at the second operating frequency.

In a refinement, determining the first driving signal further includes determining a plurality of varying slots of time in the first driving signal based on $t_{Slot}$ and the slot timing, wherein the driving signal is configured such that the first transmission antenna is not transmitting meaningful electrical energy during each of the plurality of varying slots of time.

In a further refinement, the plurality of varying slots of time includes a first slot, having a first slot length ($t_{Slot1}$), and a second slot having a second slot length ($t_{Slot2}$), wherein $t_{Slot2}$ is longer than $t_{Slot1}$.

In another further refinement, the plurality of varying slots includes a first slot, having a first slot length ($t_{Slot1}$), and a foreign object detection (FOD) slot, having an FOD slot length ($t_{FOD}$), wherein $t_{FOD}$ is a length of time configured for performing FOD using the wireless transmission system.

In yet a further refinement, $t_{FOD}$ is longer than $t_{Slot1}$.

In another further refinement, determining the second driving signal, by the at least one transmission controller, further includes configuring transmission of the virtual DC power signals such that transmission of the virtual DC power signals occurs, at least, within one or more of the plurality of varying slots of time.

In yet a further refinement, determining the second driving signal further includes configuring transmission of the virtual DC power signals such that the second transmission antenna is not transmitting meaningful electrical energy while the first transmission antenna is transmitting meaningful electrical energy.

In yet another further refinement, determining the second driving signal is further configured to encode data signals in-band of the virtual DC power signals and the data signals are encoded in the virtual DC power signals during at least one of the one or more of the plurality of varying slots of time.

In yet a further refinement, $t_{Slot}$ for at least one member of the plurality of varying slots of time is based, at least in part, on communications characteristics of the data signals.

In another further refinement, the at least one controller is further configured to decode data signals from the virtual DC power signals, the data signals being encoded in the virtual DC power signal by a receiver of the DC power signals.

In yet a further refinement, $t_{Slot}$ for at least one member of the plurality of varying slots of time is based, at least in part, on communications characteristics of the data signals.

In yet another further refinement, determining the first driving signal includes configuring the slot timing to occur after each passage of a periodic slot time, the periodic slot time based, at least in part, on the virtual AC power frequency.

In yet a further refinement, the periodic slot time is an AC-on time ($t_{ACOn}$), wherein $$t_{ACOn} = N * \left(\frac{1}{f_{vAC}}\right),$$

wherein N is a number of cycles of a waveform for the virtual AC wireless signals, and
wherein $f_{vAC}$ is the virtual AC power frequency.

In yet a further refinement, $t_{ACOn}$ ends at one of a plurality of virtual zero crosses of the virtual AC power signals, and each of the plurality of slots begins at one of the plurality of virtual zero crosses.

In yet a further refinement, $t_{ACOn}$ begins after passage of $t_{Slot}$.

In yet a further refinement, $t_{Slot}$ is in a range of about 0.5 milliseconds (ms.) to about 15 ms.

In accordance with another aspect of the disclosure, a wireless power receiver system is disclosed. The wireless power receiver system includes a first receiver antenna, a second receiver antenna, a first receiver power conditioning system, and a second receiver power conditioning system. The first receiver antenna is configured to couple with a first transmission antenna and receive virtual AC power signals from the first transmission antenna, the first receiver antenna operating based on a first operating frequency, the virtual AC power signals based on the first operating frequency, a virtual AC power frequency, a variable slot length, and a slot timing. The second receiver antenna is configured to couple with a second transmission antenna and receive virtual DC power signals from the second transmitter antenna, the second receiver antenna operating based on a second operating frequency, the virtual DC power signals configured to be received when the first receiver antenna is not receiving meaningful electrical energy, wherein the virtual DC power signals are configured to carry in-band data signals. The first receiver power conditioning system is configured to (i) receive the virtual AC power signals, (ii) convert the virtual AC power signals to alternating current (AC) received power signals, and (iii) provide the AC received power signals to a first load. The second receiver power conditioning system is configured to (i) receive the virtual DC power signals, (ii) convert the virtual DC power signals to DC received power signals, and (iii) provide the DC received power signals to a second load.

In a refinement, the system further includes a receiver controller configured to encode the in-band data signals carried by the virtual DC power signals during the variable slot length.

In a refinement, the system further includes a receiver controller configured to decode the in-band data signals carried by the virtual DC power signals during the variable slot length.

In accordance with yet another aspect of the disclosure, a wireless power transfer system is disclosed. The wireless power transmission system includes a wireless power transmission system and a wireless power receiver system. The wireless power transmission system includes a transmission antenna, a transmission communications system, a transmission controller, and a transmission power conditioning system. The transmission antenna is configured to couple with a receiver antenna and transmit virtual AC power signals to the receiver antenna. The transmission communications system is configured to communicate with a wireless receiver system. The transmission controller is configured to determine a driving signal for driving the transmission antenna based on an operating frequency, a virtual AC power frequency, a variable slot length, and a slot timing, wherein the variable slot length and slot timing are configured such that the transmission communications system can send or receive data within one or more slots of time based on the variable slot length and slot timing. The transmission power conditioning system includes at least one transistor that is configured to receive the driving signal, at a gate of the at least one transistor, and to receive an input power signal to generate the virtual AC power signals at the operating frequency and having peak voltages rising and falling based on the virtual AC power frequency. The wireless power receiver system includes the receiver antenna, a receiver communications system, and a receiver power conditioning system. The receiver antenna is configured for coupling with the transmission antenna and receiving the virtual AC power signals from the transmission antenna, the receiver antenna operating based on the operating frequency. The receiver communications system is configured to communicate with the wireless power transmission system by sending or receiving data during the slot. The receiver power conditioning system is configured to (i) receive the virtual AC power signals, (ii) convert the virtual AC power signals to alternating current (AC) received power signals, and (iii) provide the AC input power signals to a load.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
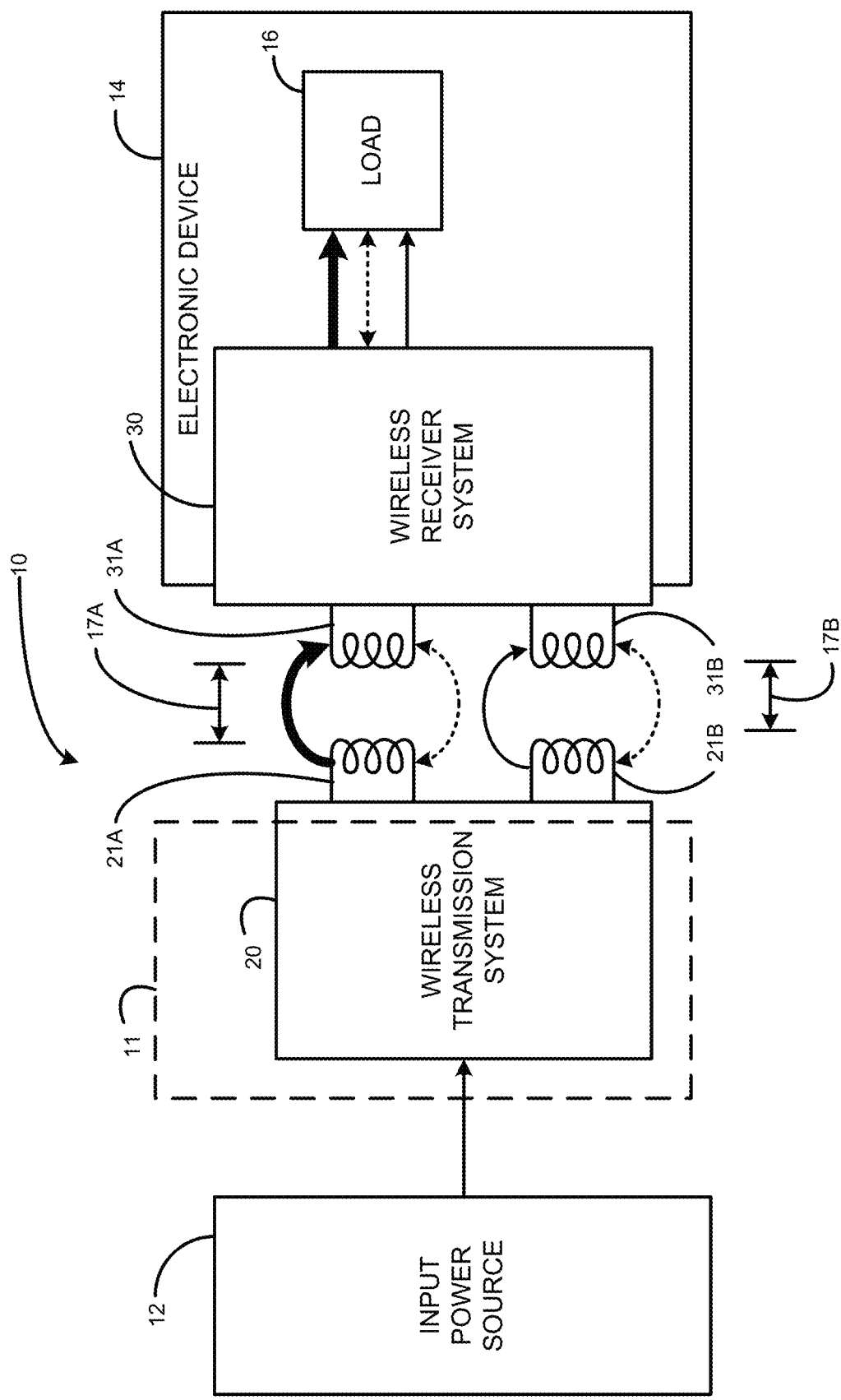
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" or "power signal" refers to an electrical signal transmitted specifically to provide meaningful electrical energy for charging and/or directly powering a load, whereas the term "electronic data signal" or "data signal" refers to an electrical signal that is utilized to convey data across a medium. "Alternating current (AC) wireless signals," as defined herein, refer to an AC signal either used to drive an antenna, either by circuitry (e.g., an amplifier) or by induction via another antenna, which may include one or both of wireless power signals and wireless data signals. A "wireless power signal," be it an AC or DC wireless power signal, is a power signal configured to provide meaningful electrical energy for charging and/or directly powering a load, wherein the wireless power signal is generated by magnetic induction based on AC wireless signals.

The wireless power transfer system 10 provides for the wireless transmission of electrical signals via near field magnetic coupling. As shown in the embodiment of FIG. 1, the wireless power transfer system 10 includes a wireless transmission system 20 and a wireless receiver system 30. The wireless receiver system is configured to receive electrical signals from, at least, the wireless transmission system 20. In some examples, such as examples wherein the wireless power transfer system is configured for wireless power transfer via the Near Field Communications Direct Charge (NFC-DC) or Near Field Communications Wireless Charging (NFC WC) draft or accepted standard, the wireless transmission system 20 may be referenced as a "listener" of the NFC-DC wireless transfer system and the wireless receiver system 30 may be referenced as a "poller" of the NFC-DC wireless transfer system.

As illustrated, the wireless transmission system 20 and wireless receiver system 30 may be configured to transmit electrical signals across, at least, one or more a separation distances or gaps 17. A separation distance or gap, such as the gaps 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of the wireless transmission system 20 and the wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when antennas of the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, a tabletop wireless power transmitter, a counter-integrated wireless power transmitter, an integrated wireless power transmitter for powering kitchen appliances, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is then used for at least two purposes: to provide electrical power to internal components of the wireless transmission system 20 and to provide electrical power to the transmitter antennas 21. The transmitter antennas 21 are configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmitter antennas 21 and respective receiver antennas 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antennas 21 or the receiver antennas 31 are strategically positioned to facilitate reception and/or transmission of wirelessly transferred electrical signals through near field magnetic induction. In some examples, antenna operating frequencies may be in a low frequency range of operation, meaning operating frequencies in a range of about 1 kHz to about 1 MHz (e.g., 85-205 kHz operating frequencies for the Qi standard, operating frequencies in a range of about 20 kHz to about 100 kHz for higher than Qi power applications). Additionally or alternatively, antenna operating frequencies may comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer. In systems wherein the wireless power transfer system 10 is operating within the NFC-DC standards and/or draft standards, the operating frequency may be in a range of about 13.553 MHz to about 13.567 MHz.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one electronic device 14, wherein the electronic device 14 may be any device that requires electrical power for any function and/or for power storage (e.g., via a battery and/or capacitor). Additionally, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, a kitchen appliance, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data (which may include control instructions and/or other forms of data). Solid lines indicate signal transmission of electrical energy over a physical and/or wireless medium, in the form of power signals that are, ultimately, utilized in wireless power transmission from the wireless transmission system 20 to the wireless receiver system 30. To that end, the thicker solid lines (e.g., as illustrated between the antennas 21A, 31A in FIG. 1) indicate transmission of "virtual AC power signals" between the wireless transmission system 20 and the wireless receiver system 30, as will be discussed in more detail below. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
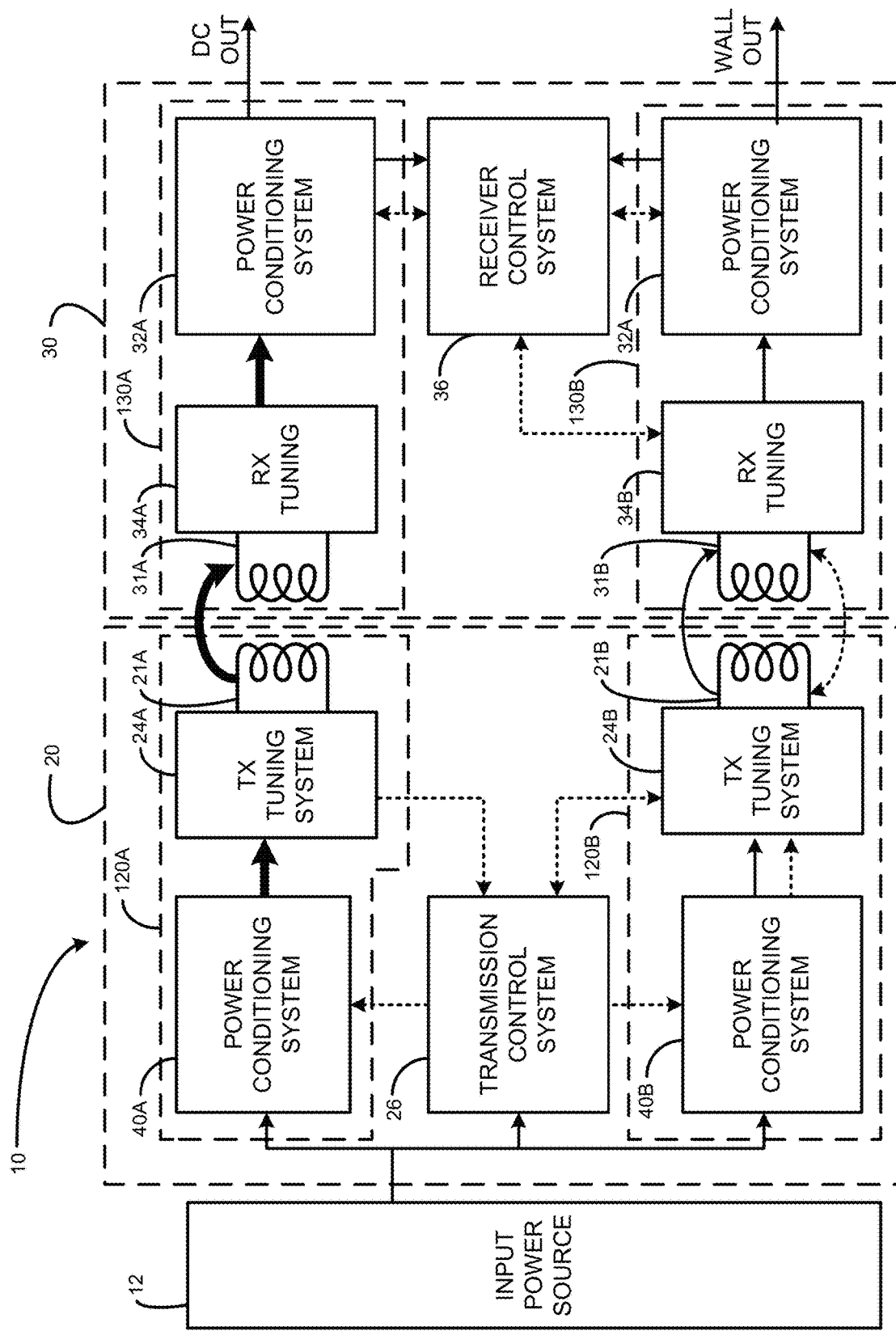
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless power transfer system 10 is illustrated as a block diagram including example components and/or subsystems of both the wireless transmission system 20 and the wireless receiver system 30. In the illustrated embodiment, the wireless transmission system includes a first transmission subsystem 120A and a second transmission subsystem 120B, along with a transmission control system 26. Similarly, the wireless receiver system may include a first receiver subsystem 130A and a second receiver subsystem 130B. The transmission subsystems 120 may include like or similar components, bearing similar reference numbers, but are generally configured for transmitting different types of electrical signals and/or wireless power signals. Similarly, the receiver subsystems 130 may include like or similar components, bearing similar reference numbers, but are generally configured for receiving different types of electrical signals and/or wireless power signals.

An "AC power signal," as defined herein, is a wireless power signal that simulates the alternating voltage characteristics of an AC power signal, such as a current or power signal that is drawn from a traditional power outlet, such as a common wall outlet. A traditional power outlet may be any power outlet, from any standards body or national/local standardization, that draws electrical power from a power delivery mechanism (e.g., a power grid, a power plant, a personal generator, solar panels, a local battery power storage, among other contemplated power sources). Such traditional power outlets may output currents or power signals having maximum voltages in a range of about 100 V to about 240 V, maximum current levels or ratings in a range of about 8 Amperes (Amps) to about 20 Amps, power levels in a maximum wattage of about 1.5 kW to about 5 kW, and AC signal frequencies in a range of about 50 Hz to about 60 Hz.

As wireless power signals are generated from AC wireless signals (typically alternating at a much higher frequency than the power signal of a traditional power outlet), a wireless power signal that is a virtual AC power signal may have a periodically varying peak voltage (at the positive and negative peaks). Such varying peak voltages rise and fall in accordance with a "virtual AC power frequency." In other words, the voltage of the virtual AC power signal periodically rises and falls based on the magnitude of the operating frequency, whereas peak voltages rise and fall in accordance with the magnitude of the virtual AC power frequency. A virtual AC power frequency is the frequency at which a virtual AC power signal rises and falls, such that the virtual AC power frequency is configured to simulate a frequency of the alternating current of AC power signals generated from a power outlet. For example, if the wireless transmission system 20 intends to simulate an AC power signal, of a power outlet, that has a frequency of about 50 Hz, then a corresponding virtual AC power signal transmitted by the wireless transmission system 20 may have a virtual AC power frequency of about 50 Hz.

Figure 3A:
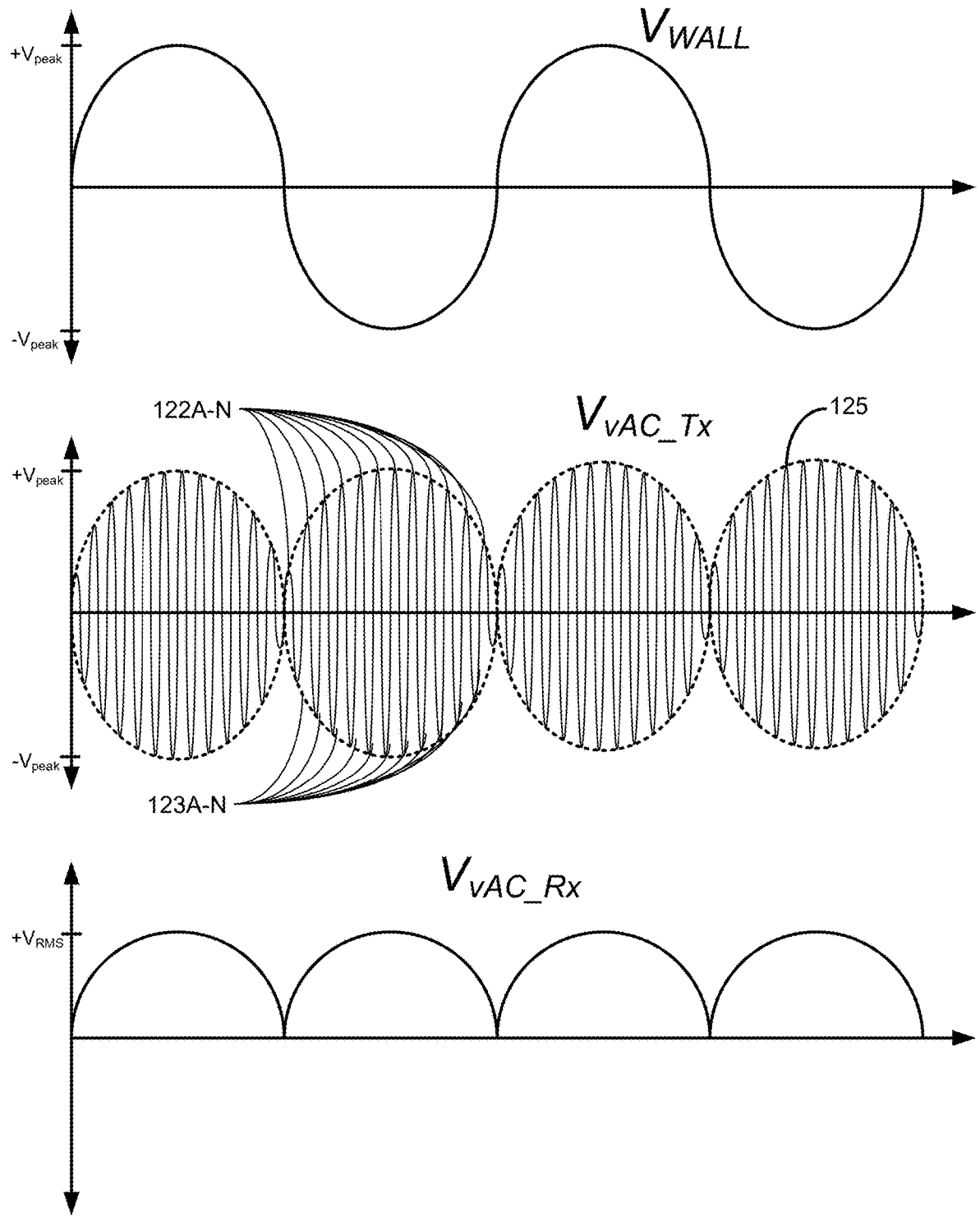
FIG. 3A is three plots of example signals that may travel through virtual AC power signal components of the wireless power transfer system, from an input stage to an ultimate output stage, in accordance with FIGS. 1-2 and the present disclosure.

Turning to FIG. 3A, three timing plots are illustrated for three signals that may be associated with the first subsystem 120A of the wireless transmission system 20. The top plot is of an example of a power signal produced by a physically connected wall outlet, such as a wall power signal ($V_{WALL}$) input to the host device 11 and/or the wireless power transmission system 20 from the input power source 12, as an input power signal to the host device. As illustrated, $V_{WALL}$ is a substantially periodic and, in this example sinusoidal, AC wave with its voltage rising and falling based on the sinusoidal waveform.

Based on and/or using power from $V_{WALL}$ or, alternatively, any other DC or AC power input to the wireless power transmission system and/or a first power conditioning system 40A, the wireless power transmission system 20 may ultimately generate a virtual AC power signal ($V_{vAC\_Tx}$) for transmission via the transmission antenna 21A. For further visual explanation of the virtual AC power signal ($V_{vAC\_Tx}$), as is illustrated in the middle plot of FIG. 3A, the rising of peak voltages 122A-N, for any number "N" of periods for the signal, and falling of peak negative voltages 123A-N, for the number "N" of periods for the signal, rise and fall with a substantially sinusoidal curve 125, wherein said sinusoidal curve 125 may be based, at least in part, on a real wall signal (e.g., $V_{WALL}$), from which the virtual AC power signal is based.

Virtual AC power signals may be considered to include two AC components—one AC component having the aforementioned operating frequency for wireless power transmission and another AC component having a virtual AC power frequency. As described herein, in examples wherein a virtual AC power signal is designed to virtualize a traditional wall outlet, the virtual AC power frequency, for such a virtual AC power signal, may be about 50 Hz or about 60 Hz. As the virtual AC power signal's virtual AC power frequency governs the rate at which a maximum for the peak voltage of the virtual AC power signal rises and falls, wherein each peak voltage is generated at the operating frequency, the virtual AC power frequency is necessarily less than the operating frequency.

As illustrated in the middle plot of FIG. 3A, the operating frequency components of the signal are illustrated in solid lines and the virtual AC power frequency components of the signal are illustrated as the dotted lines or, for example, the substantially sinusoidal curve 125. As illustrated, the magnitude of the operating frequency is much larger than that of the frequency of the substantially sinusoidal curve 125. As illustrated, a mirror of the curve 125 is illustrated corresponding with the peak negative voltages of curve 125, having a substantially similar wave form as the curve 125, but for negative voltages; this is illustrated to track rise and fall of the negative voltages 123A-N and is not intended to simulate a wave form or curve. While not illustrated to the scale of a real relationship between an operating frequency and a virtual AC power frequency, it is shown wherein the virtual AC power frequency is less than the operating frequency and said frequencies may be in any range suitable for a given system. In some examples, the virtual AC power frequency may be in a range of about 50 to about 60 Hz, comparable to traditional wall power signal frequencies, like the illustrated frequency of the sinusoid of $V_{WALL}$. In some such examples, the operating frequency for the virtual AC power signal may be in a range of about 20 kHz to about 150 kHz.

As illustrated, the plot for $V_{vAC\_Rx}$ may be substantially similar, in shape, to the waveform of the curve 125, while having a lower maximum peak voltage ($V_{RMS}$), when compared to the positive maximum peak voltage ($+V_{peak}$) of the curve 125. Thus, $V_{vAC\_Rx}$ is a received $V_{vAC\_Tx}$, but rectified, by the wireless receiver system 30 and, thus, eliminating the operating frequency AC component of $V_{vACTx}$. Thus, $V_{vAC\_Rx}$ may represent a series of root-means square (RMS) average voltages, sampled at a consistent rate, output by the rectifier, wherein each period of the curve has a peak RMS voltage ($V_{RMS}$) at the top of each period of the curve of $V_{vAC\_Rx}$. As $V_{vAC\_Rx}$ is based on $V_{vAC\_TX}$, but rectified, and $V_{vAC\_Tx}$ has negative voltage components, $V_{RMS}$ will be less than $+V_{peak}$ and, thus, $V_{vAC\_Rx}$ appears as a scaled version of the curve 125.

Referring back to FIG. 2, the first transmission subsystem 120A is shown to include, at least, a power conditioning system 40A, a transmission tuning system 24A, and the transmission antenna 21A. The first transmission subsystem 120A is configured to determine, prepare, generate, and/or transmit a virtual AC power signal. In other words, the first transmission subsystem 120A is configured to generate a wireless power signal that is utilized by the wireless receiver system 30 to power a device with said power signal simulating characteristics of wired power signals that are output by any traditional wall power outlet (e.g., a wall outlet having any of various different voltage and current ratings, shapes, sizes and/or connector types that may commonly be used for wall outlets). Thus, the resultant virtual AC power signal received at the wireless receiver system 30 may simulate characteristics of standard wired and/or physically-contact-based wall power signals.

Figure 3B:
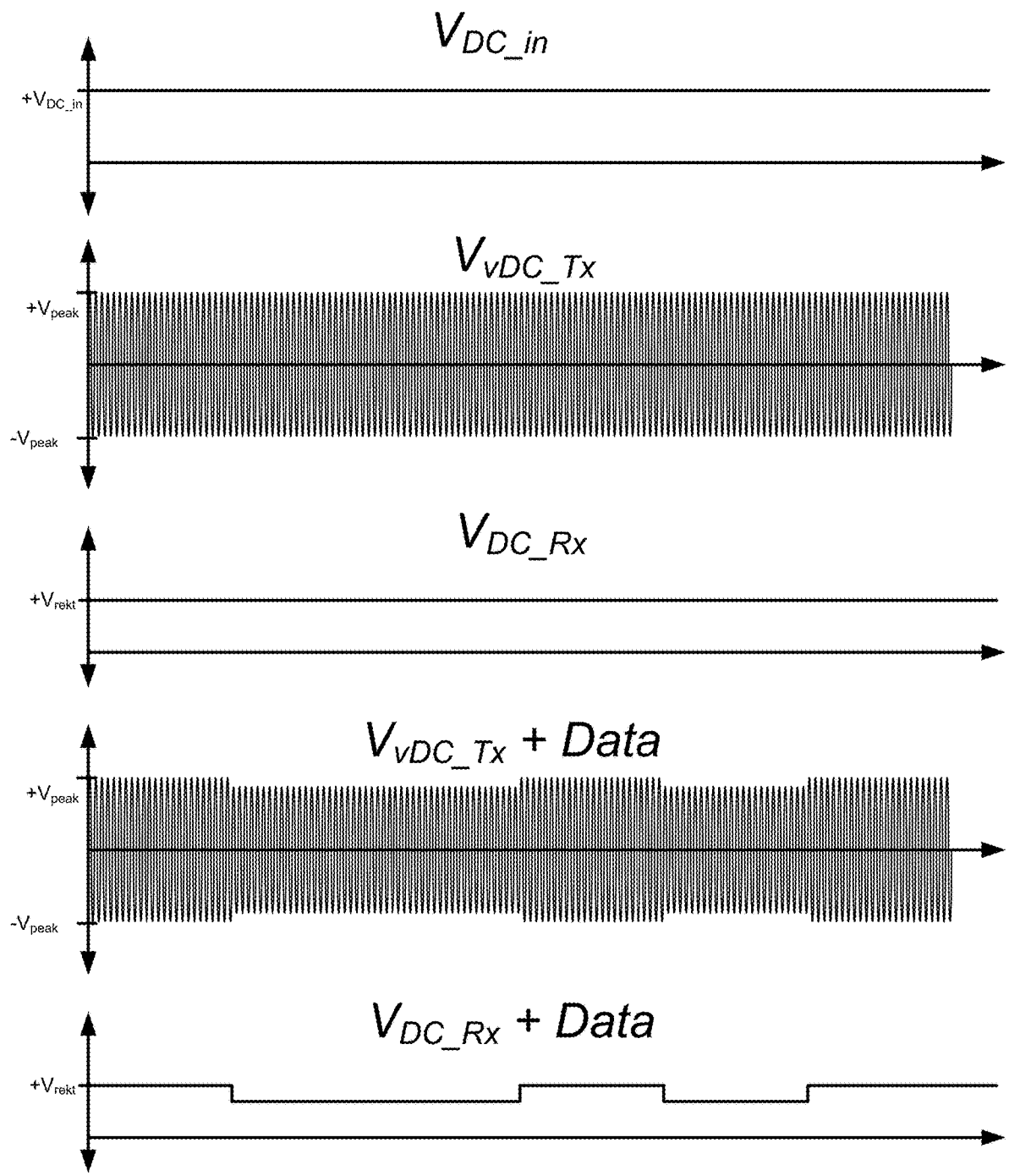
FIG. 3B is three plots of example signals that may travel through virtual DC power signal components of the wireless power transfer system, from an input stage to an ultimate output stage, in accordance with FIGS. 1-2 and the present disclosure.

Turning now to FIG. 3B, five signals are illustrated in timing diagrams. The signals herein are generated, determined, prepared, tuned, and/or output by the second transmission subsystem 120B. The second transmission subsystem 120B may be configured to transfer one or both of a wireless power signal and a wireless data signal. The signals transmitted by the first transmission subsystem 120A are substantially constant periodic wireless power signals, with a constant peak voltage; however, such a constant peak voltage is subject to variance due to changes in a desired output voltage to the receiver system 30 and/or perturbations made in the signal for in-band communications signals (Data) encoded into the wireless power signals. On the other hand, the wireless power signals transferred by the second transmission subsystem 120B may be considered virtual DC power signals, as the resultant signal at the rectifier of the wireless receiver system 30 is a substantially constant DC power signal, with given changes in the consistent peak voltage due to voltage or current change requests and/or perturbations caused by the encoding of in-band communications signals.

In FIG. 3B, the top signal illustrated is $V_{DC}$_in, which may be any input DC signal of the wireless transmission, such as a DC input via the input power source 12, a DC input generated at the second power conditioning system 40B and/or the voltage regulator 46 thereof, among other example DC power sources. In the second from the top plot, a virtual DC wireless power signal ($V_{vDC\_Tx}$) is illustrated having a constant operating frequency for a substantially sinusoidal wave form, which has a substantially consistent peak voltage ($+V_{peak}$) and peak negative voltage ($-V_{peak}$). $V_{vDC\_Tx}$ consistently oscillates between $+V_{peak}$ and $-V_{peak}$, at the operating frequency, wherein $V_{peak}$ may be altered to change the power output to the wireless receiver system 30. The third plot from the top illustrates $V_{DC\_Rx}$, which is the resultant output DC power signal of the wireless receiver system, based on $V_{vDC\_Tx}$ and processed at, for example, a rectifier of the wireless receiver system 30. As such, $V_{DC\_Rx}$ has a relatively consistent voltage, inherent to a DC power signal.

The fourth plot from the top of FIG. 3B illustrates $V_{vDC\_Tx}$ again, but with perturbations in the signal, which may be encoded by one or both of the wireless transmission system 20 or the wireless receiver system 30 as in-band communications signals (Data), which will be discussed in greater detail below. Accordingly, when the peak voltage of $V_{vDC\_Tx}$ is raised and lowered slightly to encode Data, the resultant DC output of the wireless receiver system 30 may show similar perturbations in its actual DC power output. While the illustrations of $V_{vDC\_Tx}$+Data shows an amplitude shift keyed signal (ASK), it is certainly contemplated, and discussed below, that Data may be encoded using other in-band encoding, such as, but not limited to, on off keying (OOK).

The second transmission subsystem 120B includes, at least, a second power conditioning system 40B, a second transmission tuning system 24B, and the transmission antenna 21B. The second transmission subsystem 120B is configured to determine, prepare, generate, and/or transmit the virtual DC power signal. In other words, the second transmission subsystem 120B is configured to generate a wireless power signal and/or data signal that is utilized by the wireless receiver system 30 to power a device with said power signal simulating characteristics of wireless power signals that are output by a DC power source, such as a power adapter, a power port (e.g. a USB port, a Lightning port, among other ports), and/or a connected battery. Thus, the received virtual DC power signal received at the wireless receiver system 30 may simulate characteristics of standard wired and/or physical-contact-based DC power signals.

Figure 3C:
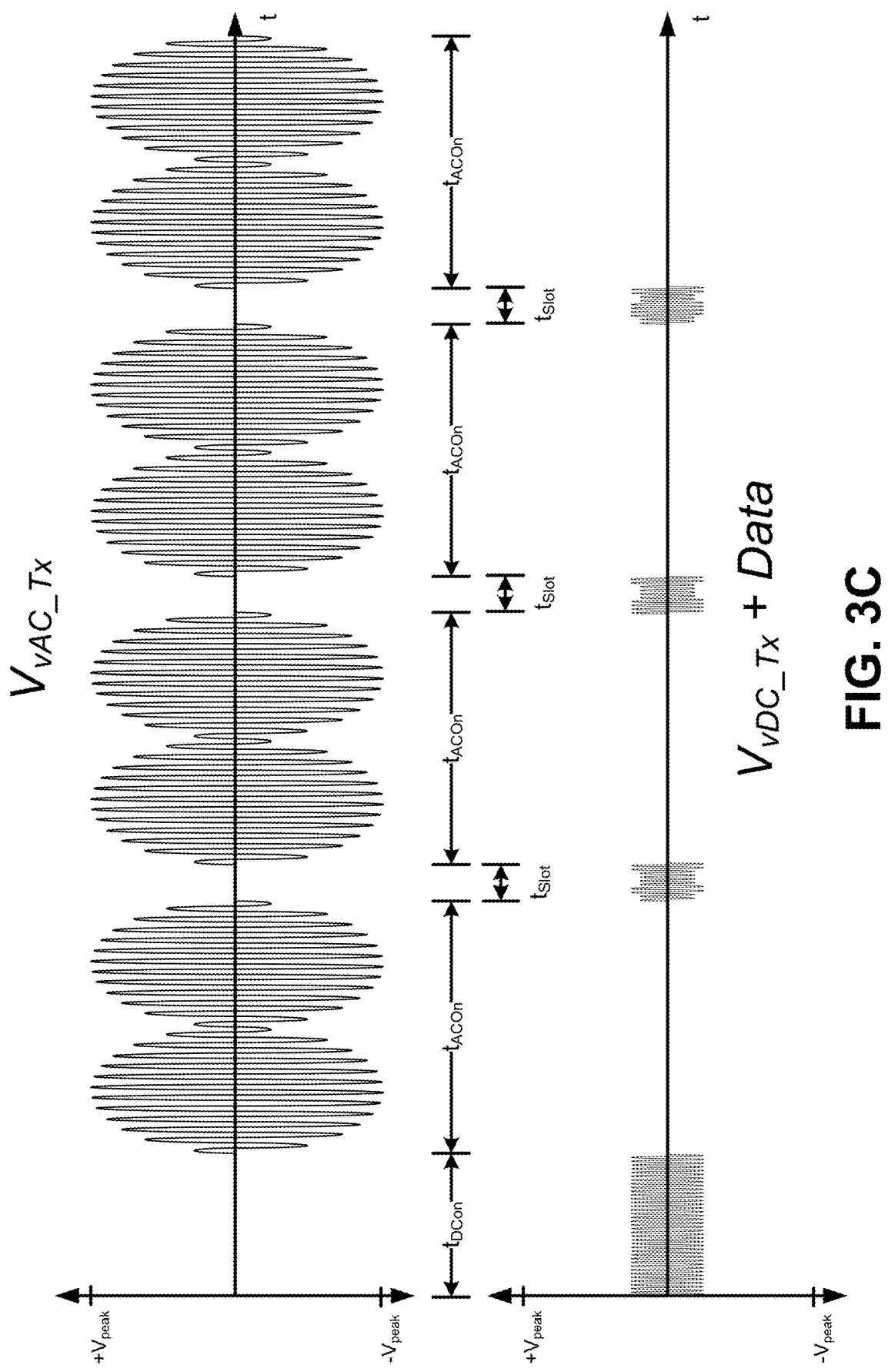
FIG. 3C is example timing diagrams, in synchronization, showing example slotted communications utilizing the virtual DC power signals for data communications within a slot in the virtual AC power signals, in accordance with FIGS. 1-3B and the present disclosure.

Turning now to FIG. 3C, timing diagrams are illustrated for wireless power signals ($V_{vAC\_Tx}$ and $V_{vDC\_Tx}$+Data) emitted by the first and second subsystems 120A,B, on a common timescale. In other words, $V_{vAC\_Tx}$ and $V_{vDC\_Tx}$+Data are illustrated during a concurrent period of time. The top plot illustrates the virtual AC power signals emitted by the first subsystem 120A and the bottom plot illustrates the virtual DC power signals emitted by the second subsystem 120B. A combination of the illustrated plots of FIG. 3C shows operation of a slotted communications system, method, and/or protocol.

In such a slotted communications system, method, and/or protocol, transmission $V_{vACTx}$ is configured to stop for a slot of time having a slot length ($t_{slot}$) during wireless power transmission, then resume transmission at the end of $t_{Slot}$. The positioning, within the AC wireless power signals, of the slots of $t_{Slot}$ may be based on a determined slot timing for the slots of $t_{Slot}$. The slot timing may be determined as a suitable amount of time suitable for transmission of meaningful electrical energy, via the AC wireless power signals, prior to halting transmission, for $t_{slot}$, to transmit one or both $V_{vDC\_Tx}$ and Data.

A slot of length $t_{Slot}$ may occur after any number "N" of periods of cycles $V_{vAC\_Tx}$ to define an "on time" for $V_{vAC\_Tx}$, between two slots of length $t_{Slot}$. This "on time" may be defined as an "AC-on time" ($t_{ACOn}$), which is a continuous time at which the subsystem 120A is transmitting a portion of a virtual AC wireless signal. Thus, if $t_{ACOn}$ is a duration defined by a desired number "N" of cycles of a period ($T_{vAC}$) of $V_{vDC\_Tx}$, at the virtual AC power frequency ($f_{vAC}$), then, as a period is the inverse of frequency, $$t_{ACOn} = N * T_{vAC},$$

and, thus, $$t_{ACOn} = N * \left(\frac{1}{f_{vAC}}\right).$$

A slot of length $t_{Slot}$ may be timed to occur at a virtual zero-cross of $V_{vAC\_Tx}$ and restarted, after $t_{Slot}$ has passed from said virtual zero-cross. In other words, when the peak voltage of virtual AC power signal reaches its lowest or near-zero absolute magnitude (e.g., about 0 V), $t_{Slot}$ may occur. "Virtual zero-cross," as defined herein, refers to a moment in signal transmission of a virtual AC power signal, that simulates an actual zero-cross of a wall AC signal, wherein an actual zero-cross is the moment in signal transmission where its voltage is equal to 0 V.

During one or more slots of length $t_{slot}$, the second subsystem 120B may be configured to transmit, at least, a data signal and, in some examples, transmit some meaningful electrical energy as a virtual DC power signal with in-band communications. Thus, communications over the system 10 may occur intermittently during recurrences of $t_{Slot}$, by encoding the in-band signals by one or both of the wireless transmission system 20 and the wireless receiver system 30. Such communications in $t_{slot}$ or, in other words, "slotted communications," may be utilized to avoid interference between the virtual AC power signals and the virtual DC power signals. Additionally or alternatively, such slotted communications may be utilized to avoid malfunction or operational maladies to one or more of the second subsystem 120B, the transmission control system 26, and/or the wireless receiver system 30, during transmission by the first subsystem 120A.

In some examples, the virtual DC power signals may be utilized to power on or otherwise provide wireless power to the electronic device 14, when the virtual AC power signals are not being transmitted, as illustrated in FIG. 3C at the DC power signal on time ($t_{DCon}$). The portion of $V_{vDC\_Tx}$ that powers the electronic device 14, prior to the transmission of $V_{vAC\_Tx}$, during $t_{DCon}$, may be a secondary power transmitter providing a secondary power transmission to the electronic device. DC power signal transmission during non-transmission of the virtual AC power signals may be utilized to provide meaningful electrical energy to components of the electronic device 14, wherein such components may require lower power input than the components that are powered, at least in part, by the virtual AC power signals.

For example, consider that the electronic device 14 is an appliance that includes a motor that is powered by the virtual AC power signals and a control system for, at least, the motor. The electronic device 14 may receive the lower power virtual DC power signal from the second subsystem 120B, when the virtual AC power signal is not transmitted, and use the meaningful electrical energy of the virtual DC power signal to power the control system. Then, in some such examples, the control system of the electronic device 14 may control operations of the motor of the electronic device 14 and communicate to the wireless transmission system 20 (e.g., by encoding communications in the virtual DC power signals via the wireless receiver system 30). During such communications, the electronic device 14 and/or control system thereof may instruct the wireless transmission system 20 to begin transmission of virtual AC power signals, wherein such controls/communications are enabled, at least in part, by the input power of the virtual DC power signal.

Figure 3D:
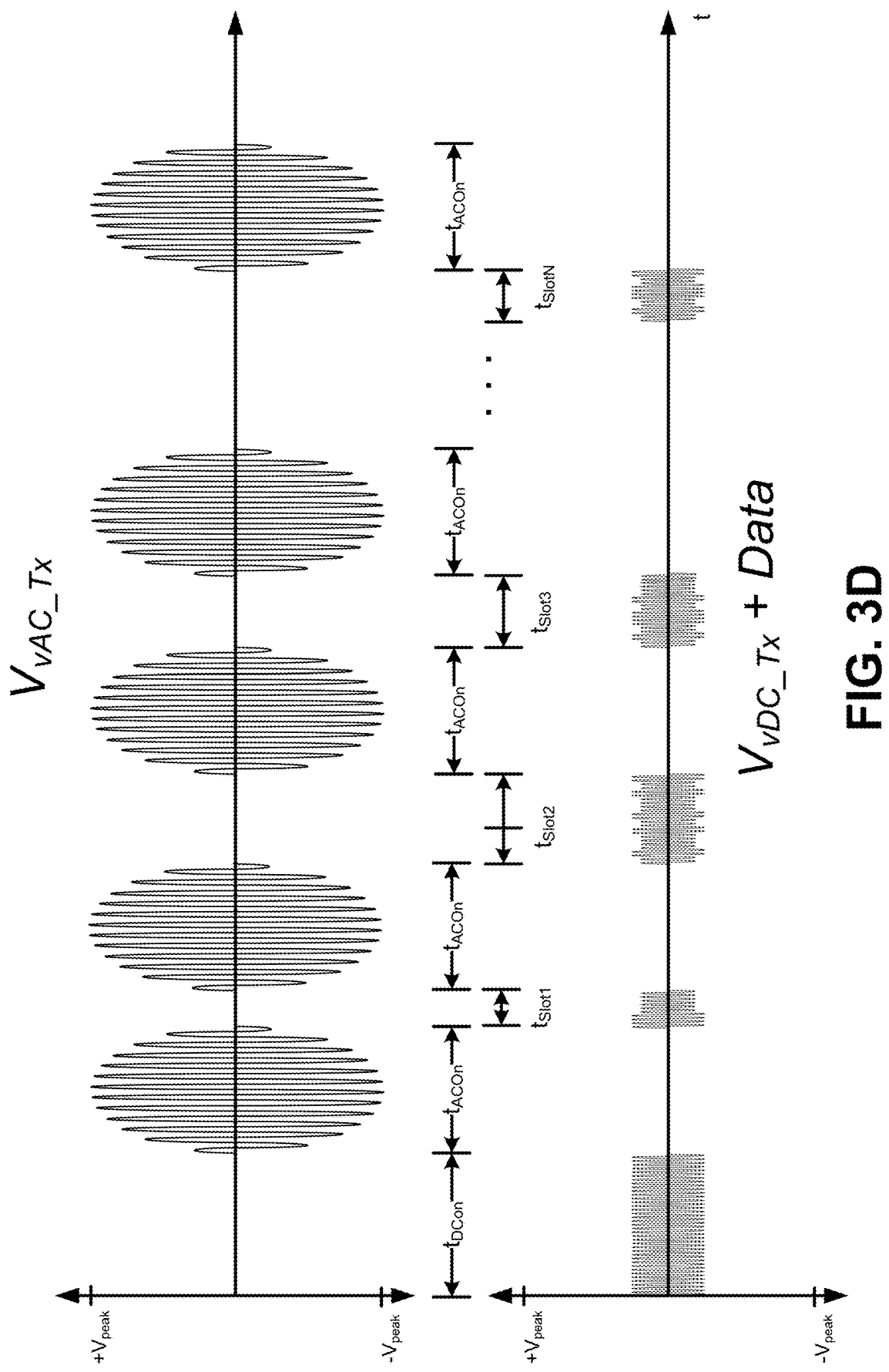
FIG. 3D is example timing diagrams, in synchronization, showing another example of slotted communications utilizing the virtual DC power signals for data communications within a slot in the virtual AC power signals, in accordance with FIGS. 1-3C and the present disclosure.

Turning now to FIG. 3D and with continued reference to FIGS. 3A-C, another example of slotted communications, utilizing the system(s) 10, is illustrated as two plots on a common time scale, wherein the top plot is for $V_{vAC\_Tx}$ and the bottom plot is for $V_{vDC\_Tx}$+Data. As illustrated, $V_{vAC\_Tx}$ is transmitted as a plurality of cycle groupings (one cycle is illustrated, however, as discussed above, such cycle groupings can be of any "N" number of cycles) occurring during an AC-on time ($t_{ACOn}$), each cycle grouping separated by one of the plurality of slots of time having a slot length ($t_{slot}$). However, in contrast to the example of FIG. 3C, $t_{Slot}$ may be a variable slot length and, thus, each of the plurality of slots of time ($t_{Slot1}, t_{Slot2}, \ldots, t_{SlotN}$) may be one of a plurality of varying slots of time. "Varying slots of time" and "variable slot length" refer to slots of time and their respective slot lengths that may be altered during transmission of one or both of $V_{vAC\_Tx}$ and $V_{vDC\_Tx}$. Thus, the variable slot lengths may not all be the same length and, for example, may vary based on a pre-planned or pre-programed variance in slot width and/or such variable slot lengths may dynamically lengthen or contract, based on operating conditions associated with the system 10. For example, such operating conditions may include communications conditions, wherein one or both of the transmission system 20 and the receiver system 30 wish to either reduce or expand the amount of communications data transferred, during wireless power transfer operations. In such examples with variable slot lengths for $t_{Slot}$, a range for $t_{Slot}$ may be in a range of about 0.5 ms to about 15 ms.

Figure 3E:
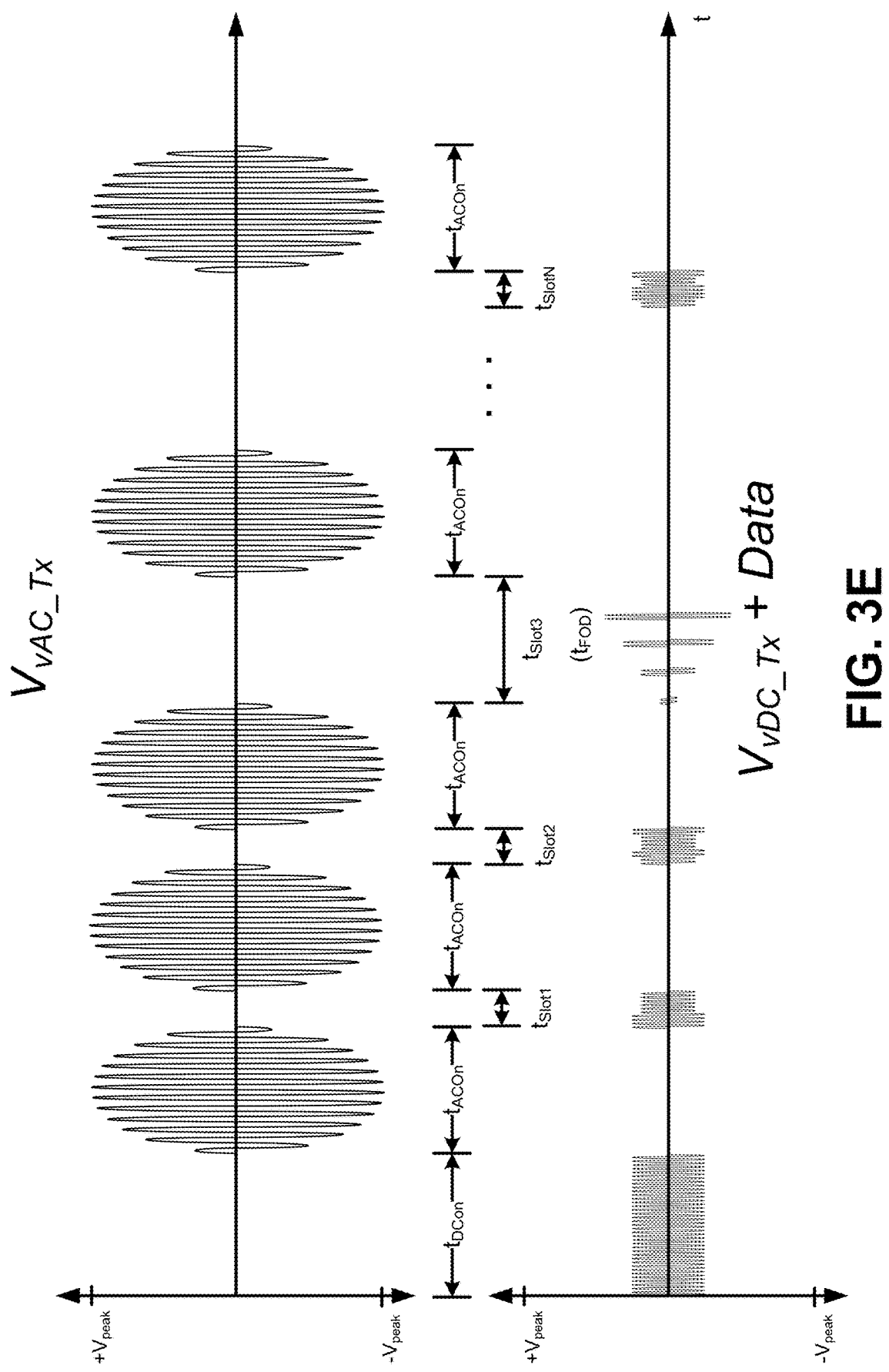
FIG. 3E is example timing diagrams, in synchronization, showing another example of slotted communications utilizing the virtual DC power signals for data communications within a slot in the virtual AC power signals, in accordance with FIGS. 1-3D and the present disclosure.

FIG. 3E is another example of slotted communications, utilizing the wireless power transfer system 10, illustrated as two plots on a common time scale, wherein the top plot is for $V_{vAC\_Tx}$ and the bottom plot is for $V_{vDC\_Tx}$+Data. As illustrated, $V_{vAC\_Tx}$ is transmitted as a plurality of cycle groupings (one cycle is illustrated, however, as discussed above, such cycle groupings can be of any "N" number of cycles) occurring during an AC-on time ($t_{ACOn}$), each cycle grouping separated by one of the plurality of slots of time having a slot length ($t_{slot}$). In contrast to FIG. 3D, a majority of the slots have a length of time ($t_{Slot1}, t_{Slot2}, \ldots t_{SlotN}$), a majority of durations for $t_{Slot}$ are substantially similar (still, this is only for the purposes of discussion and any values for $t_{slot}$ may vary or differ). However, at one or more intervals during transmission, $t_{Slot}$ may expand such that the wireless transmission system 20 is capable to perform a foreign object detection (FOD), to detect if any non-receiver or unacceptable device is proximate to the system(s) 10, 20, 30. Examples and further description of FOD is discussed below with respect to the sensing system 50 of FIG. 5.

As illustrated in FIG. 3E, a longer slot width for FOD ($t_{FOD}$) may be utilized in a plurality of slots of time to make time for components of the wireless transmission system 20 to perform the FOD process. In some such examples, the second transmission subsystem 120B may be configured to perform FOD for the wireless transmission system 20. In such examples, the transmission antenna 21B may be configured to emit one or more short bursts or pings of wireless power signals, for determining if a foreign object is present. Thus, having variable slot lengths in the virtual AC power signals may enable proper and/or more accurate FOD in the wireless power transfer system 10.

Note that the frequencies of the signals illustrated in the timing diagrams of FIGS. 3A-E are not to the scale of exemplary, real-life signals used in wireless power transfer and/or data transfer systems and the illustrated signals are, most likely, illustrated as lower frequencies than would be utilized in real life. Such lower frequencies are only illustrated as lower magnitude, so that the reader of the instant application can view the substantially sinusoidal shape, the rising and falling peaks of virtual AC signals, and/or the relative scales of system frequencies, as they relate to one another (e.g., wherein operating frequency of the virtual DC power signal is greater than the operating frequency of the virtual AC power signal, both of which are greater than the virtual AC power frequency).

Further, one or more of the characteristics of the signals of FIGS. 3A-E may be encoded, decoded, determined, and/or configured by one or more of the disclosed controller(s). As will be discussed in more detail below, such characteristics may be used by the controller(s) in determining and/or providing a driving signal, for provision to the power conditioning system(s) 40A, 40B, for driving the antenna(s) 21A, 21B.

Returning now to FIG. 2, a first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antennas 21. Accordingly, the second portion of the input energy is modified and/or conditioned by the power conditioning systems 40. While not illustrated, it is certainly contemplated that one or both of the first and second portions of the input electrical energy may be modified, conditioned, altered, and/or otherwise changed prior to receipt by the power conditioning systems 40 and/or transmission control system 26, by further contemplated subsystems (e.g., a voltage regulator, a current regulator, switching systems, fault systems, safety regulators, among other things).

Figure 4A:
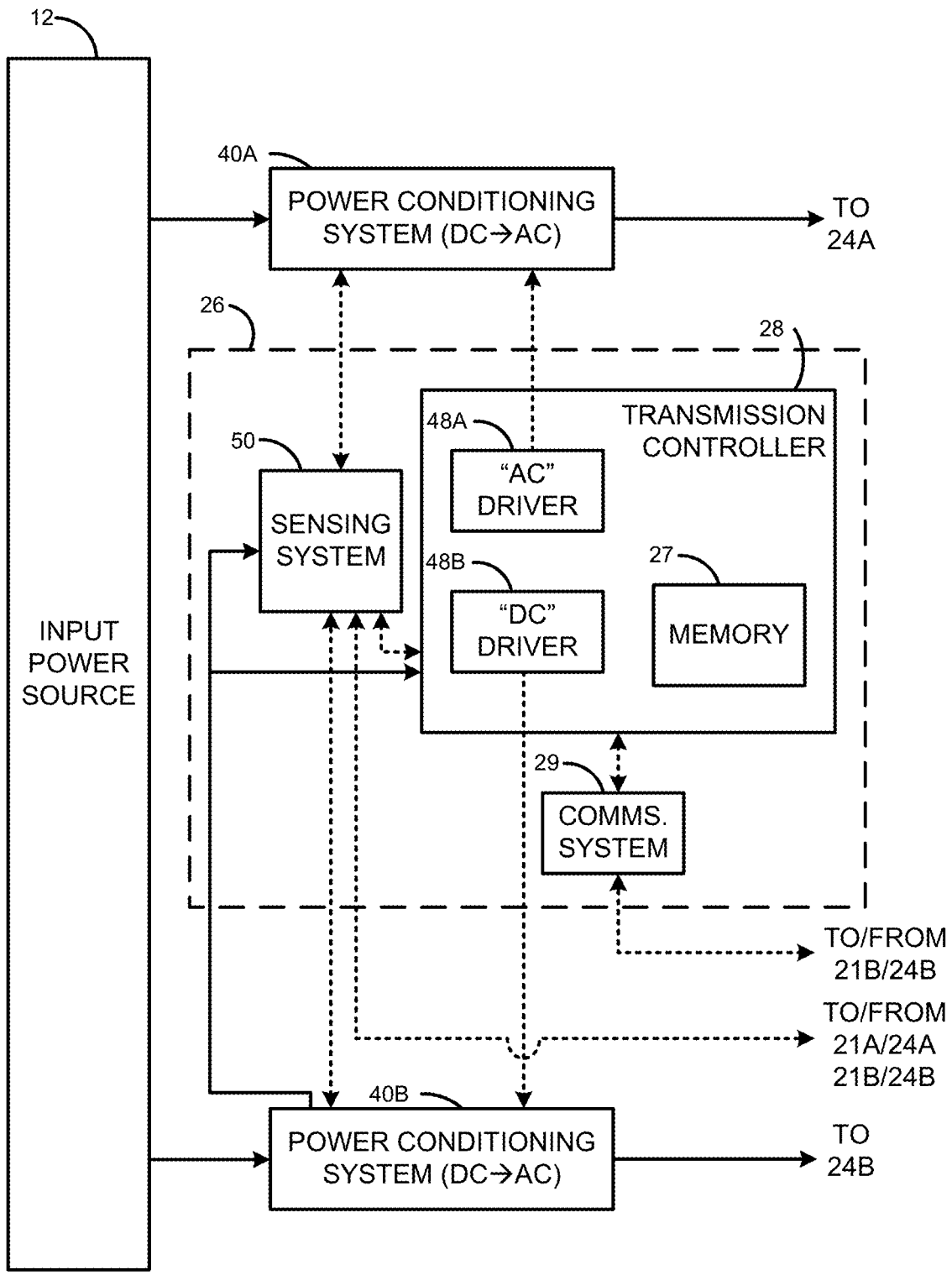
FIG. 4A is a block diagram illustrating components of a transmission control system of the wireless transmission system of FIG. 2, in accordance with FIG. 1-3E and the present disclosure.
Figure 4B:
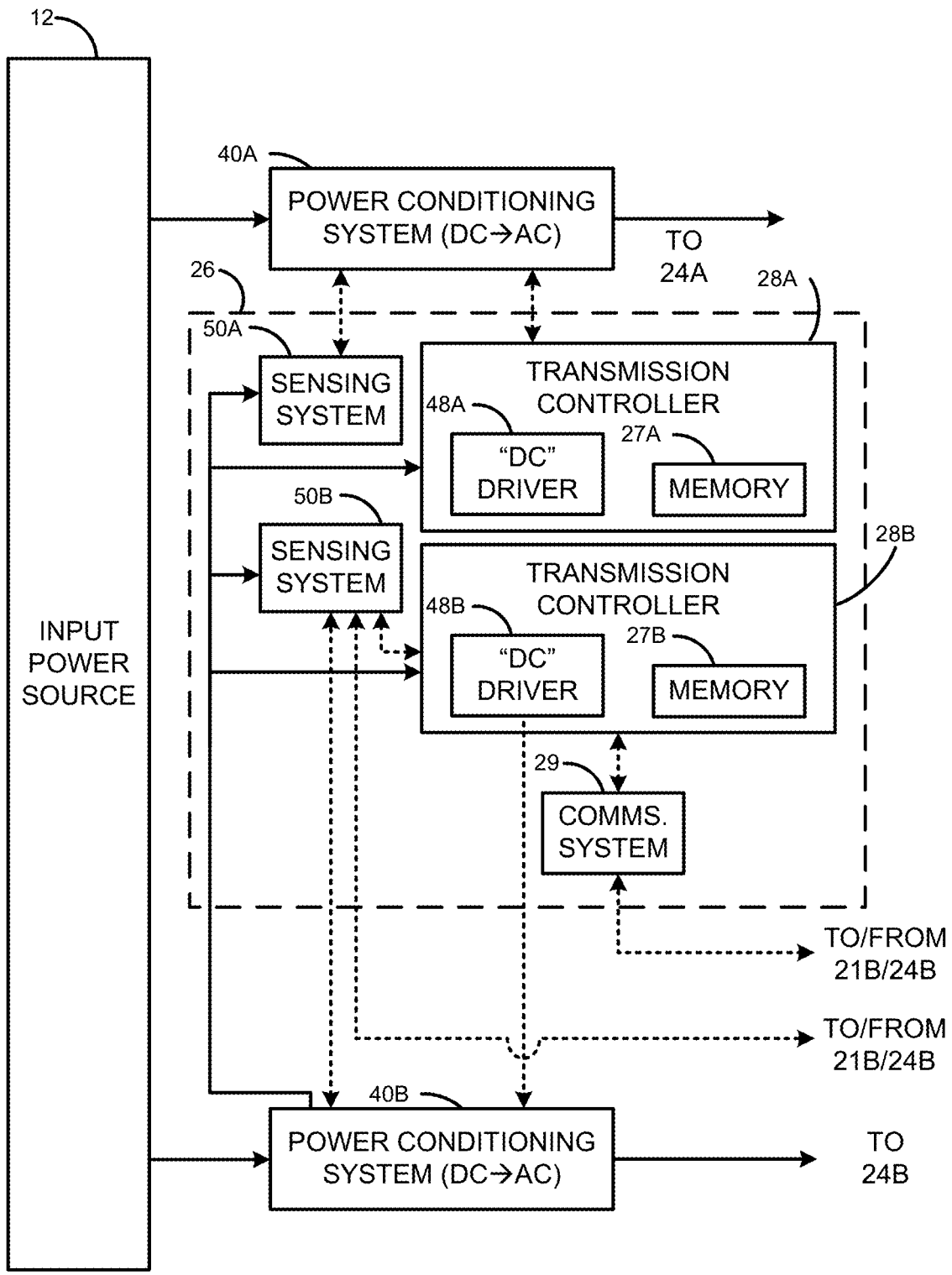
FIG. 4B is an alternative block diagram illustrating components of a transmission control system of the wireless transmission system of FIG. 2, in accordance with FIGS. 1-4A and the present disclosure.

Referring now to FIGS. 4A and 4B, with continued reference to FIGS. 1-3E, subcomponents and/or systems of the transmission control system 26 are illustrated. The transmission control system 26 may include sensing system(s) 50, transmission controller(s) 28, a communications system 29, drivers 48A, B, and memory 27. FIG. 4A illustrates an example for the wireless transmission system 20, wherein both of the subsystems 120A, B are controlled by a common transmission controller 28 and are both influenced and/or monitored by a common sensing system 50. However, as illustrated in FIG. 4B, it is certainly contemplated that the transmission control system 26 includes multiple transmission controllers 28A, B, each for, respectively, controlling subsystems 120A, 120B. Further still, as illustrated in FIG. 4B, it is certainly contemplated that the transmission control system 26 includes multiple sensing system 50A, B, for independently monitoring, respectively, the subsystems 120A, B.

The transmission controller(s) 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller(s) 28 may be a single controller or may include more than one controller disposed to control various functions and/or features of the wireless transmission system 20. Functionality of the transmission controller(s) 28 may be implemented in hardware and/or software and may rely on one or more data maps relating to the operation of the wireless transmission system 20. To that end, the transmission controller(s) 28 may be operatively associated with the memory 27. The memory may include one or more of internal memory, external memory, and/or remote memory (e.g., a database and/or server operatively connected to the transmission controller(s) 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver(s) 48A, 48B, the memory 27, the communications system 29, the sensing system 50, among other contemplated elements) of the transmission control system 26, such components may be integrated with the transmission controller(s) 28. In some examples, the transmission controller 28 may be an integrated circuit configured to include functional elements of one or both of the transmission controller 28 and the wireless transmission system 20, generally.

As illustrated, the transmission controller(s) 28 is in operative association, for the purposes of data transmission, receipt, and/or communication, with, at least, the memory 27, the communications system 29, the power conditioning system(s) 40, the driver(s) 48, and the sensing system 50. The drivers 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system(s) 50 may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiver system 30, the input power source 12, the host device 11, the transmission antennas 21, the receiver antenna 31, along with any other components and/or subcomponents thereof.

Figure 5:
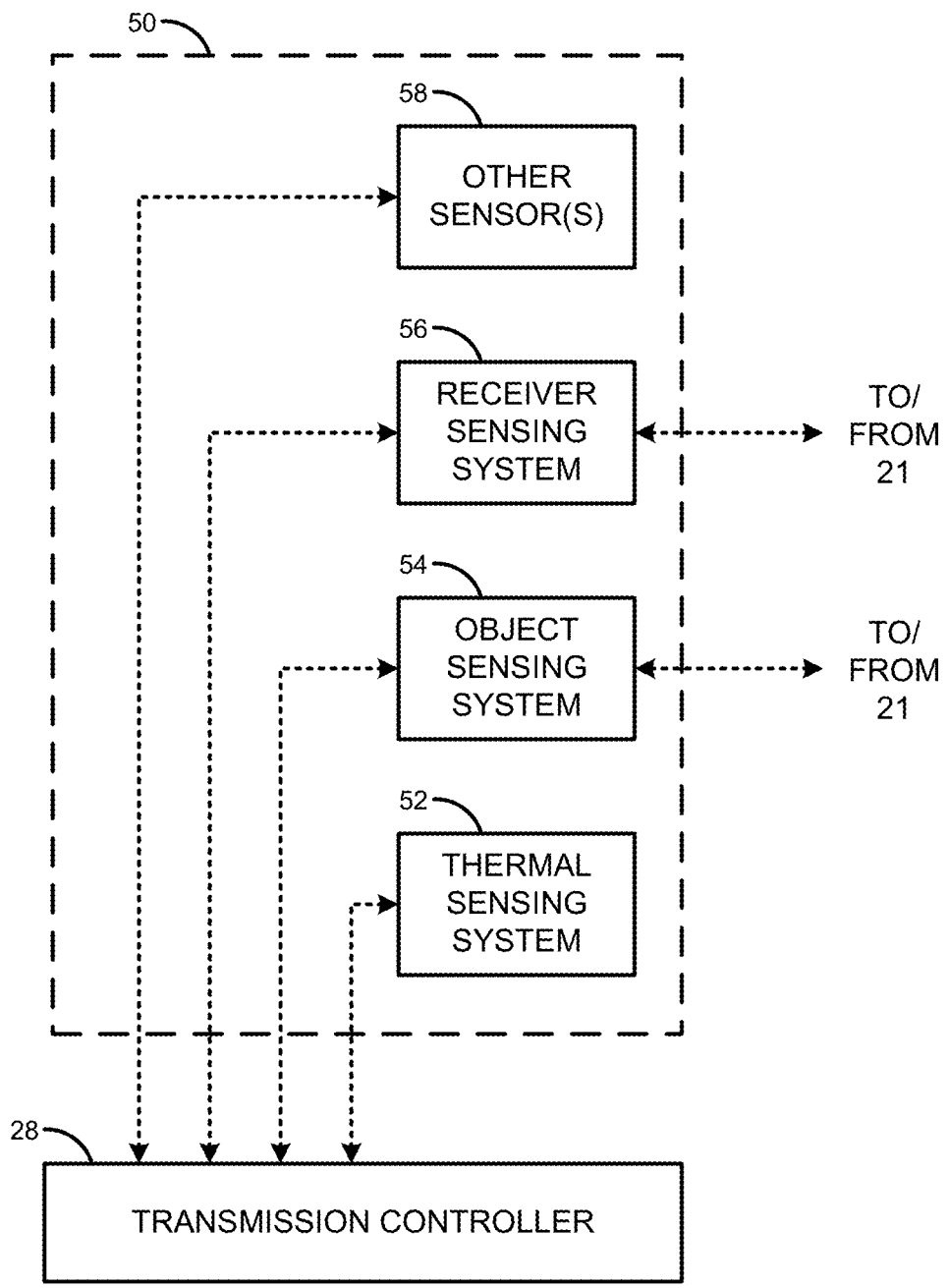
FIG. 5 is a block diagram illustrating components of a sensing system of the transmission control system of FIG. 4, in accordance with FIGS. 1-4B and the present disclosure.

As illustrated in the embodiment of FIG. 5, the sensing system(s) 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller(s) 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 5, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller(s) 28 analyzes a change in electrical impedance observed by the transmission antenna 21 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antennas 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 6:
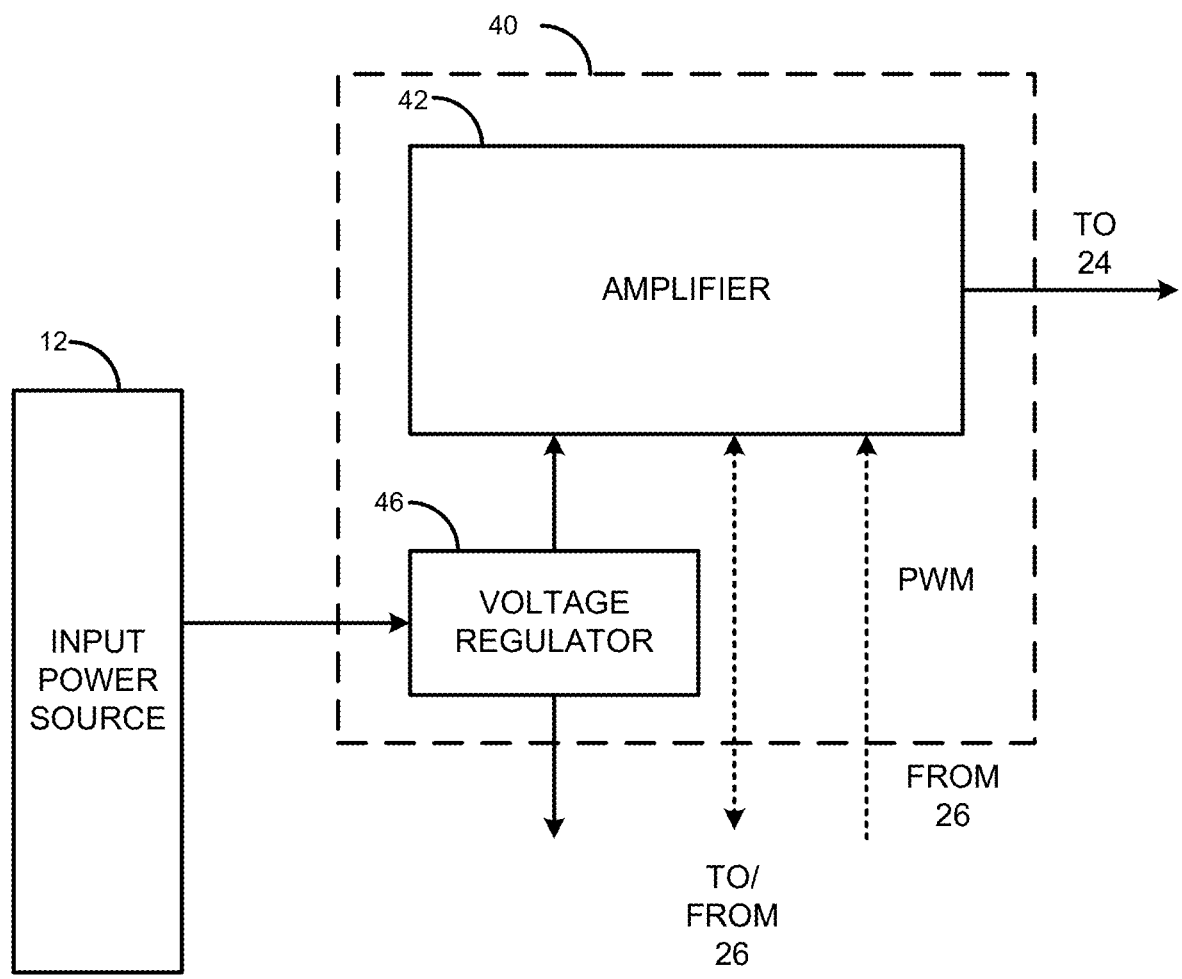
FIG. 6 is a block diagram illustrating components of a power conditioning system of the wireless transmission system of FIG. 2, in accordance with FIG. 1, FIG. 2, and the present disclosure.

Referring now to FIG. 6, and with continued reference to FIGS. 1-4, a block diagram illustrating an embodiment exemplary of one or both of the power conditioning systems 40A, B is illustrated. At the power conditioning system 40, electrical power is received, generally, as a DC or AC power source, via the input power source 12 itself or an intervening power converter, converting an AC source to a DC source (not shown). A voltage regulator 46 receives the electrical power from the input power source 12 and is configured to provide electrical power for transmission by the antennas 21 and provide electrical power for powering components of the wireless transmission system 20. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 6, such a first portion is transmitted to, at least, the sensing system(s) 50, the transmission controller(s) 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an AC as output, based, at least in part, on PWM input from the transmission control system 26. The amplifier 42 may be or include, for example, a power stage invertor, such as a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 5 kW.

In some examples for the power conditioning system 40B for the second transmission subsystem 120B, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

While illustrated as similar components, the components of the first power conditioning system 40A may be quite different from the second power conditioning system 40B, as the first power conditioning system 40A has the amplifier 42 receive instructions for and subsequently generates the virtual AC power signals. Alternatively, the second power conditioning system is configured for transmitting a virtual DC power signal and, thus, the amplifier 42B will be configured as such. Additionally or alternatively, the amplifier 42A may be configured for a low operating frequency, whereas the amplifier 42B may be configured for a high operating frequency.

Figure 7:
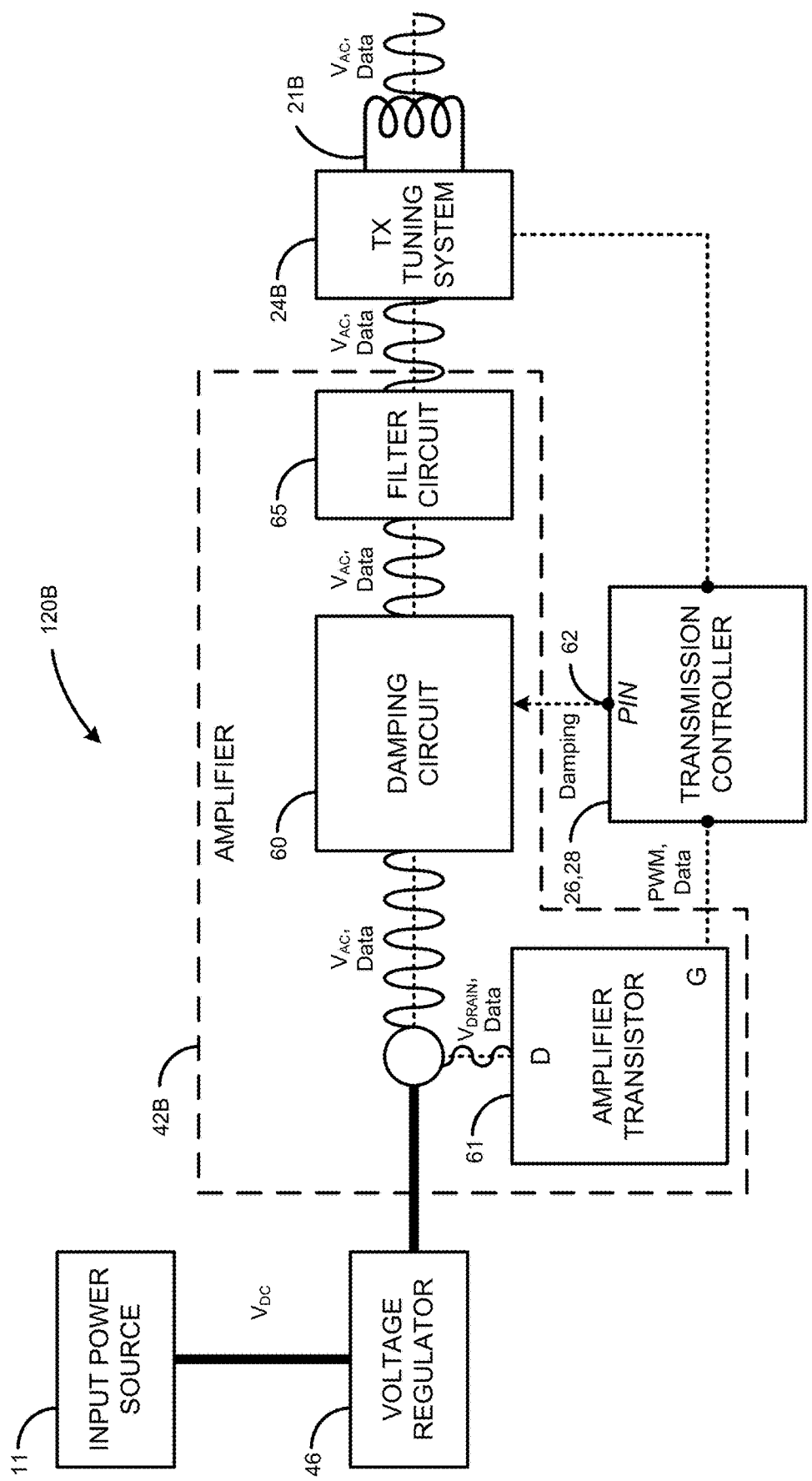
FIG. 7 is a block diagram of elements of the wireless transmission system of FIGS. 1-6, further illustrating components of an amplifier of the power conditioning system of FIG. 6 and signal characteristics for wireless power transmission, in accordance with FIGS. 1-6 and the present disclosure.
Figure 8:
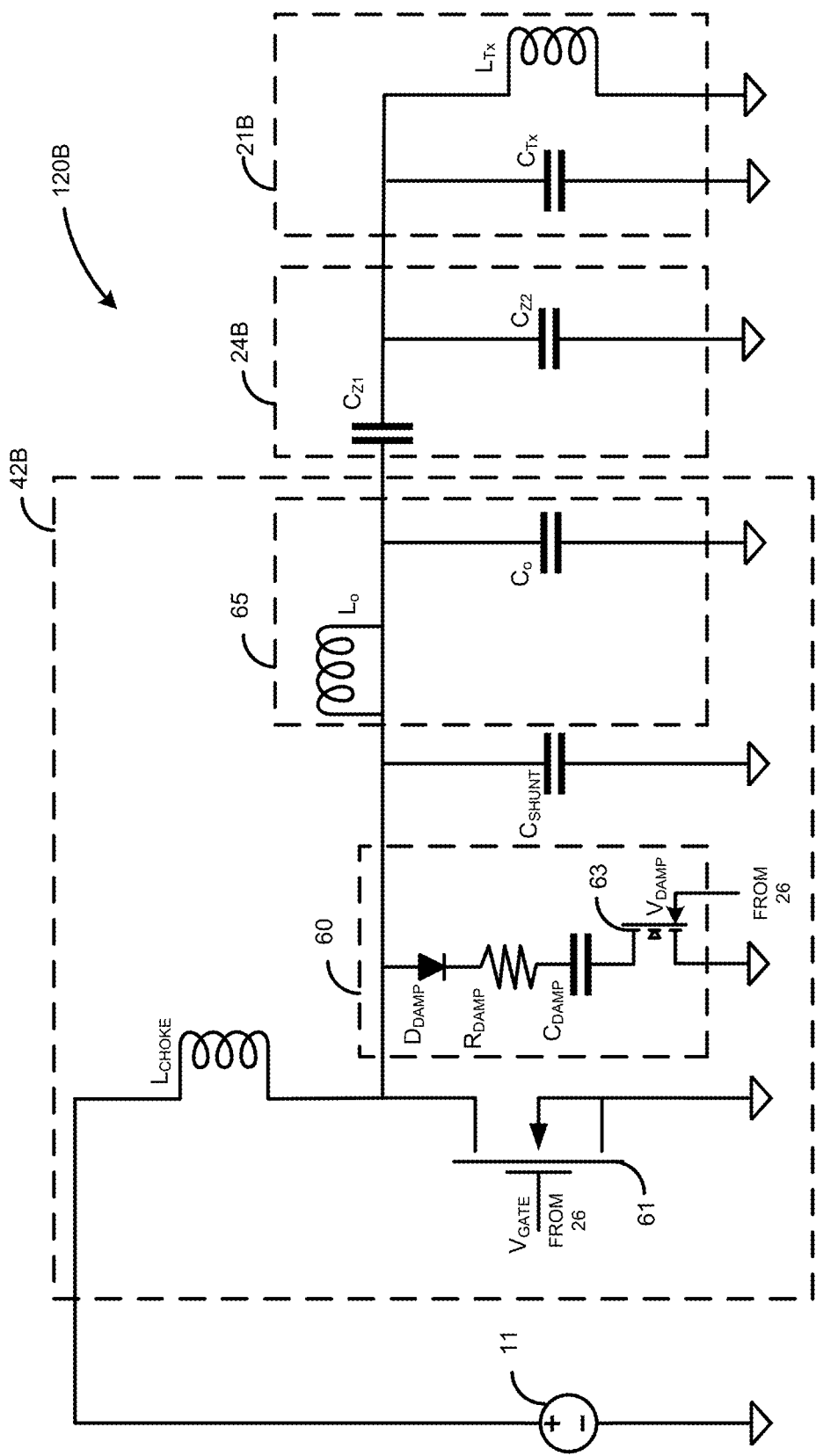
FIG. 8 is an electrical schematic diagram of elements of the wireless transmission system of FIGS. 1-7, further illustrating components of an amplifier of a power conditioning system of FIGS. 5-7, in accordance with FIGS. 1-7 and the present disclosure.

Turning now to FIGS. 7 and 8, the components of the second transmission subsystem 120 B are illustrated, further detailing elements of the power conditioning system 40B, an amplifier 42B, the tuning system 24B, among other things. The block diagram of the second transmission sub system 120B illustrates one or more electrical signals and the conditioning of such signals, altering of such signals, transforming of such signals, inverting of such signals, amplification of such signals, and combinations thereof. In FIG. 7, actual, not virtual, DC power signals are illustrated with heavily bolded lines, such that the lines are significantly thicker than other solid lines in FIG. 7 and other figures of the instant application, AC signals are illustrated as substantially sinusoidal wave forms with a thickness significantly less bolded than that of the DC power signal bolding, and data signals are represented as dotted lines. It is to be noted that the AC signals are not necessarily substantially sinusoidal waves and may be any AC waveform suitable for the purposes described below (e.g., a half sine wave, a square wave, a half square wave, among other waveforms). FIG. 8 illustrates sample electrical components for elements of the wireless transmission system, and subcomponents thereof, in a simplified form. Note that FIG. 8 may represent one branch or sub-section of a schematic for the second transmission sub system 120B and/or components of the second transmission sub system 120B may be omitted from the schematic illustrated in FIG. 8 for clarity.

As illustrated in FIG. 7 and discussed above, the input power source 12 provides an input direct current voltage ($V_{DC}$), which may have its voltage level altered by the voltage regulator 46, prior to conditioning at the amplifier 42B. In some examples, as illustrated in FIG. 8, the amplifier 42B may include a choke inductor $L_{CHOKE}$, which may be utilized to block radio frequency interference in $V_{DC}$, while allowing the DC power signal of $V_{DC}$ to continue towards an amplifier transistor 61 of the amplifier 42B. $V_{CHOKE}$ may be configured as any suitable choke inductor known in the art.

The amplifier 42B is configured to alter and/or invert $V_{DC}$ to generate an AC wireless signal $V_{AC}$, which, as discussed in more detail below, may be configured to carry one or both of an inbound and outbound data signal (denoted as "Data" in FIG. 7). The amplifier transistor 61 may be any switching transistor known in the art that is capable of inverting, converting, and/or conditioning a DC power signal into an AC power signal, such as, but not limited to, a field-effect transistor (FET), gallium nitride (GaN) FETS, bipolar junction transistor (BJT), and/or wide-bandgap (WBG) semiconductor transistor, among other known switching transistors. The amplifier transistor 61 is configured to receive a driving signal (denoted as "PWM" in FIG. 7) from at a gate of the amplifier transistor 61 (denoted as "G" in FIG. 7) and invert the DC signal $V_{DC}$ to generate the AC wireless signal at an operating frequency and/or an operating frequency band for the second transmission sub system 120B. The driving signal may be a PWM signal configured for such inversion at the operating frequency and/or operating frequency band for the second transmission sub system 120B.

The driving signal is generated and output by the transmission control system 26 and/or the transmission controller 28 therein, as discussed and disclosed above. The transmission controller 26, 28 is configured to provide the driving signal and configured to perform one or more of encoding wireless data signals (denoted as "Data" in FIG. 7), decoding the wireless data signals (denoted as "Data" in FIG. 7) and any combinations thereof. In some examples, the electrical data signals may be in band signals of the AC wireless power signal. In some such examples, such in-band signals may be on-off-keying (OOK) signals in-band of the AC wireless power signals. For example, Type-A communications, as described in the NFC Standards, are a form of OOK, wherein the data signal is on-off-keyed in a carrier AC wireless power signal operating at an operating frequency in a range of about 13.553 MHz to about 13.567 MHz.

However, when the power, current, impedance, phase, and/or voltage levels of an AC power signal are changed beyond the levels used in current and/or legacy hardware for high frequency wireless power transfer (over about 500 mW transmitted), such legacy hardware may not be able to properly encode and/or decode in-band data signals with the required fidelity for communications functions. Such higher power in an AC output power signal may cause signal degradation due to increasing rise times for an OOK rise, increasing fall time for an OOK fall, overshooting the required voltage in an OOK rise, and/or undershooting the voltage in an OOK fall, among other potential degradations to the signal due to legacy hardware being ill equipped for higher power, high frequency wireless power transfer. Thus, there is a need for the amplifier 42B to be designed in a way that limits and/or substantially removes rise and fall times, overshoots, undershoots, and/or other signal deficiencies from an in-band data signal during wireless power transfer. This ability to limit and/or substantially remove such deficiencies allows for the systems of the instant application to provide higher power wireless power transfer in high frequency wireless power transmission systems.

Figure 9:
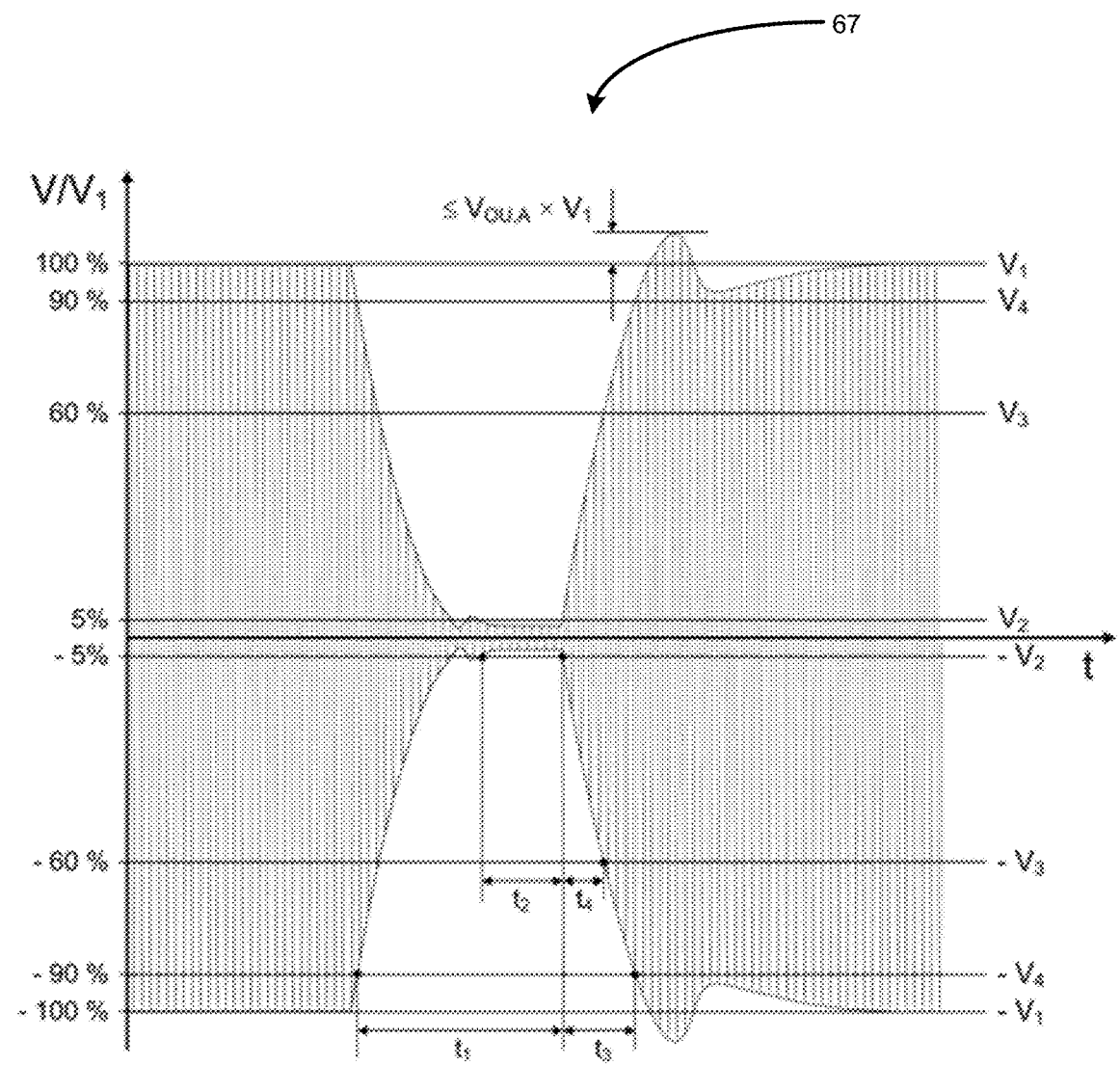
FIG. 9 is an exemplary plot illustrating rise and fall of "on" and "off" conditions when a signal has in-band communications via on-off keying.

For further exemplary illustration, FIG. 9 illustrates a plot for a fall and rise of an OOK in-band signal. The fall time ($t_1$) is shown as the time between when the signal is at 90% voltage ($V_4$) of the intended full voltage ($V_1$) and falls to about 5% voltage ($V_2$) of $V_1$. The rise time ($t_3$) is shown as the time between when the signal ends being at $V_2$ and rises to about $V_4$. Such rise and fall times may be read by a receiving antenna of the signal, and an applicable data communications protocol may include limits on rise and fall times, such that data is non-compliant and/or illegible by a receiver if rise and/or fall times exceed certain bounds.

Returning now to FIGS. 7 and 8, to achieve limitation and/or substantial removal of the mentioned deficiencies, the amplifier 42B includes a damping circuit 60. The damping circuit 60 is configured for damping the AC wireless signal during transmission of the AC wireless signal and associated data signals. The damping circuit 60 may be configured to reduce rise and fall times during OOK signal transmission, such that the rate of the data signals may not only be compliant and/or legible, but may also achieve faster data rates and/or enhanced data ranges, when compared to legacy systems. For damping the AC wireless power signal, the damping circuit includes, at least, a damping transistor 63, which is configured for receiving a damping signal ($V_{damp}$) from the transmission controller 28. The damping signal is configured for switching the damping transistor (on/off) to control damping of the AC wireless signal during the transmission and/or receipt of wireless data signals. Such transmission of the AC wireless signals may be performed by the transmission controller 28 and/or such transmission may be via transmission from the wireless receiver system 30, within the coupled magnetic field between the antennas 21B, 31B.

In examples wherein the data signals are conveyed via OOK, the damping signal may be substantially opposite and/or an inverse to the state of the data signals. This means that if the OOK data signals are in an "on" state, the damping signals instruct the damping transistor to turn "off" and thus the signal is not dissipated via the damping circuit 60 because the damping circuit is not set to ground and, thus, a short from the amplifier circuit and the current substantially bypasses the damping circuit 60. If the OOK data signals are in an "off" state, then the damping signals may be "on" and, thus, the damping transistor 63 is set to an "on" state and the current flowing of $V_{AC}$ is damped by the damping circuit. Thus, when "on," the damping circuit 60 may be configured to dissipate just enough power, current, and/or voltage, such that efficiency in the system is not substantially affected and such dissipation decreases rise and/or fall times in the OOK signal. Further, because the damping signal may instruct the damping transistor 63 to turn "off" when the OOK signal is "on," then it will not unnecessarily damp the signal, thus mitigating any efficiency losses from $V_{AC}$, when damping is not needed.

As illustrated in FIG. 8, the branch of the amplifier 42B which may include the damping circuit 60, is positioned at the output drain of the amplifier transistor 61. While it is not necessary that the damping circuit 60 be positioned here, in some examples, this may aid in properly damping the output AC wireless signal, as it will be able to damp at the node closest to the amplifier transistor 61 output drain, which is the first node in the circuit wherein energy dissipation is desired. In such examples, the damping circuit is in electrical parallel connection with a drain of the amplifier transistor 61. However, it is certainly possible that the damping circuit be connected proximate to the antenna 21, proximate to the transmission tuning system 24B.

While the damping circuit 60 is capable of functioning to properly damp the AC wireless signal for proper communications at higher power high frequency wireless power transmission, in some examples, the damping circuit may include additional components. For instance, as illustrated, the damping circuit 60 may include one or more of a damping diode $D_{DAMP}$, a damping resistor $R_{DAMP}$, a damping capacitor $C_{DAMP}$, and/or any combinations thereof. $R_{DAMP}$ may be in electrical series with the damping transistor 63 and the value of $R_{DAMP}$ (ohms) may be configured such that it dissipates at least some power from the power signal, which may serve to accelerate rise and fall times in an amplitude shift keying signal, an OOK signal, and/or combinations thereof. In some examples, the value of $R_{DAMP}$ is selected, configured, and/or designed such that $R_{DAMP}$ dissipates the minimum amount of power to achieve the fastest rise and/or fall times in an in-band signal allowable and/or satisfy standards limitations for minimum rise and/or fall times; thereby achieving data fidelity at maximum efficiency (less power lost to $R_{DAMP}$) as well as maintaining data fidelity when the system is unloaded and/or under lightest load conditions.

$C_{DAMP}$ may also be in series connection with one or both of the damping transistor 63 and $R_{DAMP}$. $C_{DAMP}$ may be configured to smooth out transition points in an in-band signal and limit overshoot and/or undershoot conditions in such a signal. Further, in some examples, $C_{DAMP}$ may be configured for ensuring the damping performed is 180 degrees out of phase with the AC wireless power signal, when the transistor is activated via the damping signal.

$D_{DAMP}$ may further be included in series with one or more of the damping transistor 63, $R_{DAMP}$, $C_{DAMP}$, and/or any combinations thereof. $D_{DAMP}$ is positioned, as shown, such that a current cannot flow out of the damping circuit 60, when the damping transistor 63 is in an off state. The inclusion of $D_{DAMP}$ may prevent power efficiency loss in the AC power signal when the damping circuit is not active or "on." Indeed, while the damping transistor 63 is designed such that, in an ideal scenario, it serves to effectively short the damping circuit when in an "off" state, in practical terms, some current may still reach the damping circuit and/or some current may possibly flow in the opposite direction out of the damping circuit 60. Thus, inclusion of $D_{DAMP}$ may prevent such scenarios and only allow current, power, and/or voltage to be dissipated towards the damping transistor 63. This configuration, including $D_{DAMP}$, may be desirable when the damping circuit 60 is connected at the drain node of the amplifier transistor 61, as the signal may be a half-wave sine wave voltage and, thus, the voltage of $V_{AC}$ is always positive.

Beyond the damping circuit 60, the amplifier 42B, in some examples, may include a shunt capacitor $C_{SHUNT}$. $C_{SHUNT}$ may be configured to shunt the AC power signal to ground and charge voltage of the AC power signal. Thus, $C_{SHUNT}$ may be configured to maintain an efficient and stable waveform for the AC power signal, such that a duty cycle of about 50% is maintained and/or such that the shape of the AC power signal is substantially sinusoidal at positive voltages.

In some examples, the amplifier 42B may include a filter circuit 65. The filter circuit 65 may be designed to mitigate and/or filter out electromagnetic interference (EMI) within the wireless transmission system 20. Design of the filter circuit 65 may be performed in view of impedance transfer and/or effects on the impedance transfer of the wireless power transmission system 20 due to alterations in tuning made by the transmission tuning system 24B. To that end, the filter circuit 65 may be or include one or more of a low pass filter, a high pass filter, and/or a band pass filter, among other filter circuits that are configured for, at least, mitigating EMI in a wireless power transmission system.

As illustrated, the filter circuit 65 may include a filter inductor $L_o$ and a filter capacitor $C_o$. The filter circuit 65 may have a complex impedance and, thus, a resistance through the filter circuit 65 may be defined as $R_o$. In some such examples, the filter circuit 65 may be designed and/or configured for optimization based on, at least, a filter quality factor $\gamma_{FILTER}$, defined as:

$$\gamma_{FILTER} = \frac{1}{R_o}\sqrt{\frac{L_o}{C_o}}.$$

In a filter circuit 65 wherein it includes or is embodied by a low pass filter, the cut-off frequency ($\omega_o$) of the low pass filter is defined as:

$$\omega_o = \frac{1}{\sqrt{L_o C_o}}.$$

In some wireless power transmission systems 20, it is desired that the cutoff frequency be about 1.03-1.4 times greater than the operating frequency of the antenna. Experimental results have determined that, in general, a larger $\gamma_{FILTER}$ may be preferred, because the larger $\gamma_{FILTER}$ can improve voltage gain and improve system voltage ripple and timing. Thus, the above values for $L_o$ and $C_o$ may be set such that $\gamma_{FILTER}$ can be optimized to its highest, ideal level (e.g., when the system 10 impedance is conjugately matched for maximum power transfer), given cutoff frequency restraints and available components for the values of $L_o$ and $C_o$.

As illustrated in FIG. 8, the conditioned signal(s) from the amplifier 42B is then received by the transmission tuning system 24B, prior to transmission by the antenna 21B. The transmission tuning system 24B may include tuning and/or impedance matching, filters (e.g. a low pass filter, a high pass filter, a "pi" or "Π" filter, a "T" filter, an "L" filter, a "LL" filter, and/or an L-C trap filter, among other filters), network matching, sensing, and/or conditioning elements configured to optimize wireless transfer of signals from the wireless transmission system 20 to the wireless receiver system 30. Further, the transmission tuning system 24B may include an impedance matching circuit, which is designed to match impedance with a corresponding wireless receiver system 30 for given power, current, and/or voltage requirements for wireless transmission of one or more of electrical energy, electrical power, electromagnetic energy, and electronic data. The illustrated transmission tuning system 24B includes, at least, $C_{Z1}$, $C_{Z2}$, and (operatively associated with the antenna 21B) values, all of which may be configured for impedance matching in one or both of the wireless transmission system 20 and the broader system 10. It is noted that $C_{Tx}$ refers to the intrinsic capacitance of the antenna 21B.

Figure 10A:
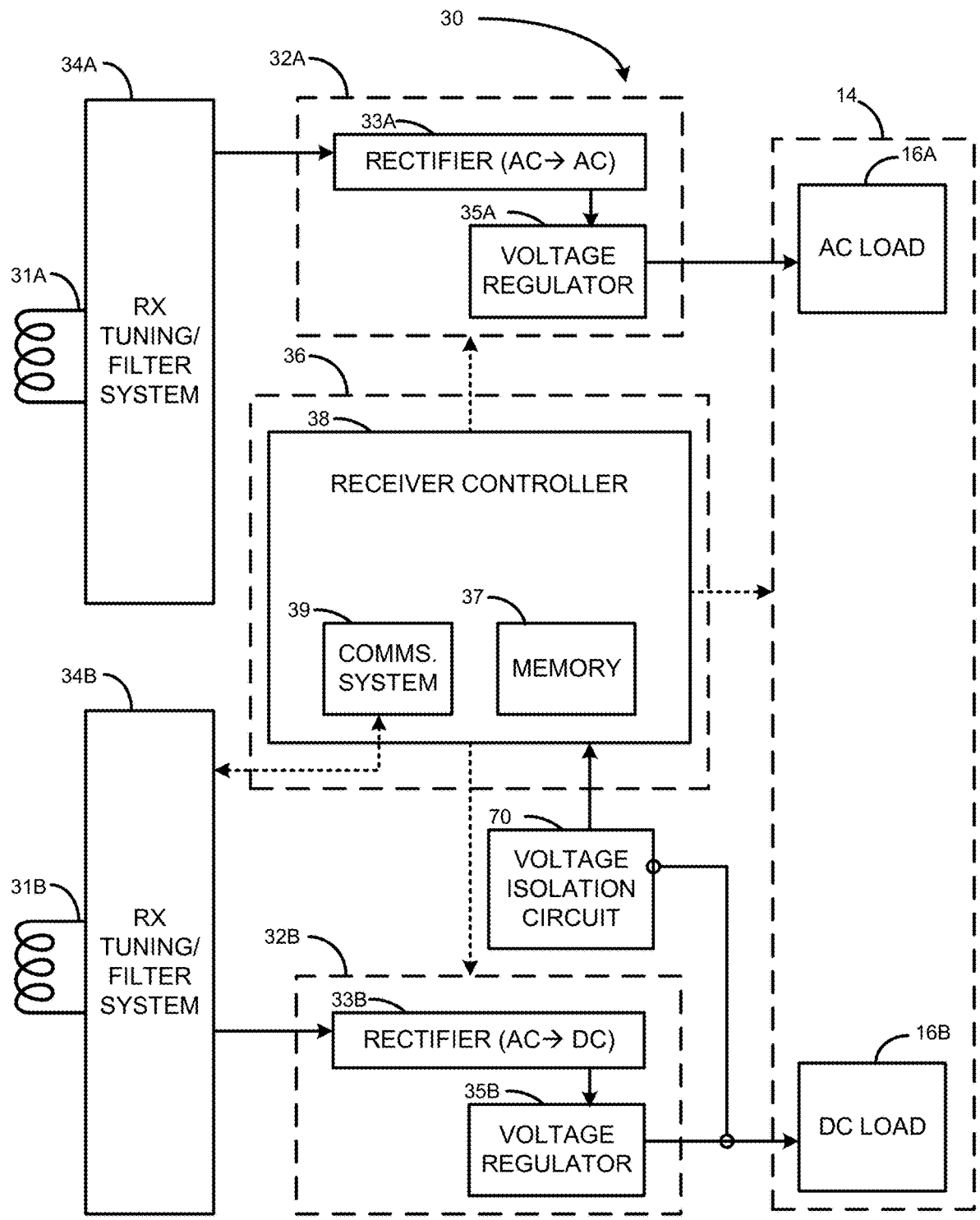
FIG. 10A is a block diagram illustrating components of a receiver control system and a receiver power conditioning system of the wireless receiver system of FIG. 2, in accordance with FIG. 1, FIG. 2, and the present disclosure.
Figure 10B:
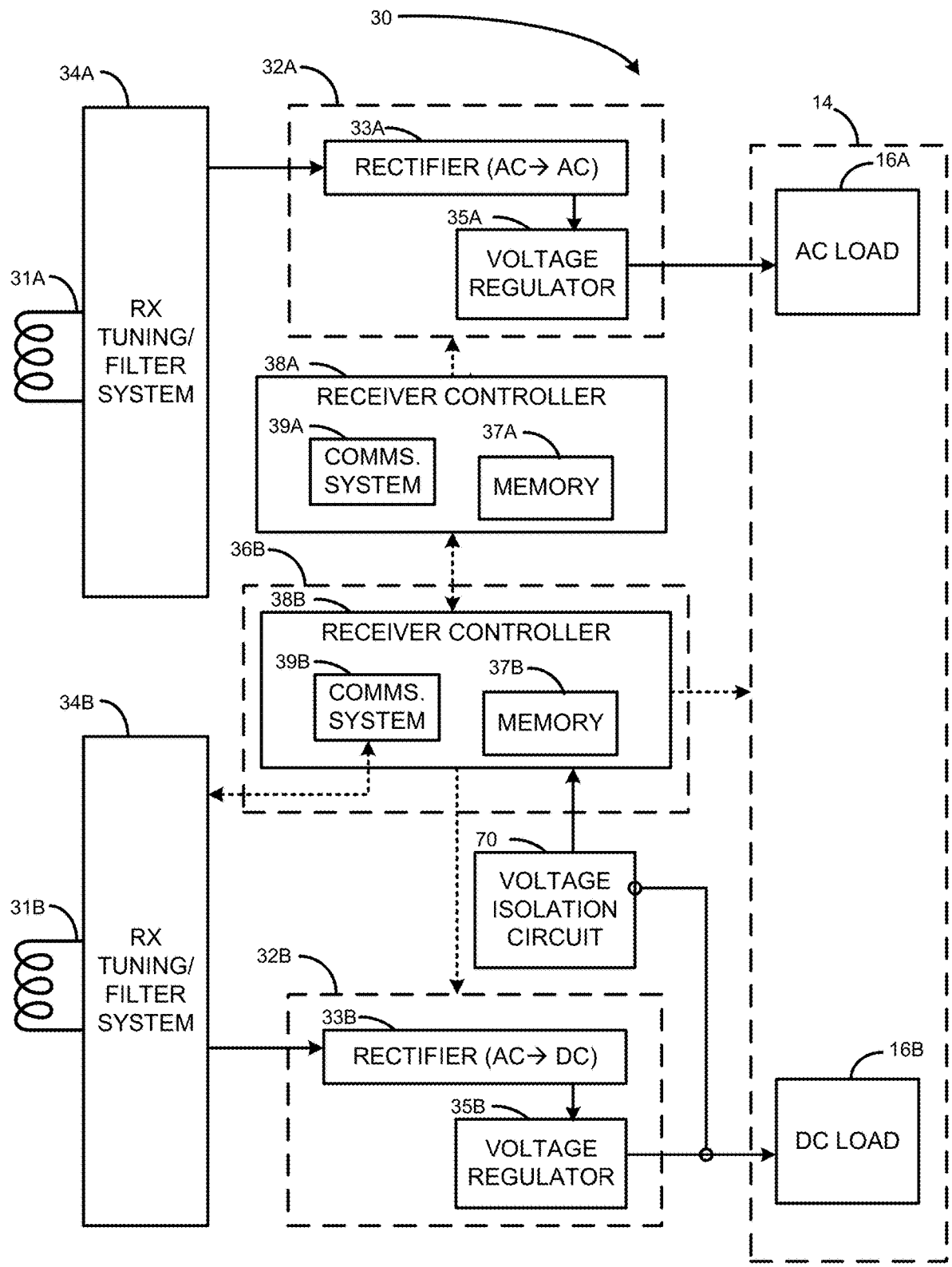
FIG. 10B is another block diagram illustrating components of a receiver control system and a receiver power conditioning system of the wireless receiver system of FIG. 2, in accordance with FIG. 1, FIG. 2, and the present disclosure.

Turning now to FIGS. 10A and 10B and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antennas 21. As illustrated in FIGS. 10A, 10B, the wireless receiver system 30 includes, at least, the receiver antennas 31, receiver tuning and filtering systems 34, power conditioning systems 32, a receiver control system 36, and a voltage isolation circuit 70. The receiver tuning and filtering systems 34 may be configured to substantially match the electrical impedances of the wireless transmission system 20. In some examples, the receiver tuning and filtering systems 34 may be configured to dynamically adjust and substantially match the electrical impedance of the receiver antennas 31 to a characteristic impedance of the power generator or the load at a driving frequency of the transmission antenna 21.

Similar to the wireless transmission system 20 and as best noted in FIG. 2, the wireless receiver system 30 includes the first receiver subsystem 130A and the second receiver subsystem 130B. As discussed above, the first receiver subsystem 130A is configured to receive the virtual AC power signals and the second receiver subsystem 130B is configured to receive the virtual DC power signals, which may include in-band, and/or receive/transmit wireless data signals, by encoding the wireless data signals in-band of the virtual DC power signals. The first receiver subsystem 130A is configured to provide, as rectified, an AC input to an AC load of the electronic device 14. The second receiver subsystem 120B is configured to facilitate communications with the wireless transmission system 20 and provide a DC power input to a DC load 16B of the electronic device 14.

As illustrated, each power conditioning system 32 includes a rectifier 33 and voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

While the rectifier 33B is configured to rectify the virtual DC signals into a substantially DC signal for the DC load, the rectifier 33A is configured to rectify the varying peak voltage virtual AC power signals to generate a substantially AC power signal for the AC load of the electronic device 14. The rectifier 33A, thus, rectifies continuously, but with wildly varying peak voltages, and, thus, each rectification step rises and falls with the rising and falling of the peak voltages of cycles (operating frequency based) of the virtual AC power signals.

Some non-limiting examples of a voltage regulator 35 include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may be an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

As illustrated in FIG. 10A, the receiver control system 36 may have one controller that controls both the first receiver subsystem 130A and the second receiver subsystem 130B. Alternatively, as illustrated in FIG. 10B, the receiver control system 36 may have multiple controllers 38A, B, each respectively associated with and for controlling subsystems 130A, B.

The receiver control system 36 may include, but is not limited to including, the receiver controller(s) 38, a communications system 39 and a memory 37. The receiver controller(s) 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller(s) 38 may be a single controller or may include more than one controller disposed to control various functions and/or features of the wireless receiver system 30. Functionality of the receiver controller(s) 38 may be implemented in hardware and/or software and may rely on one or more data maps relating to the operation of the wireless receiver system 30. To that end, the receiver controller(s) 38 may be operatively associated with the memory 37. The memory may include one or both of internal memory, external memory, and/or remote memory (e.g., a database and/or server operatively connected to the receiver controller(s) 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller(s) 38. In some examples, the receiver controller 38 may be and/or include one or more integrated circuits configured to include functional elements of one or both of the receiver controller(s) 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller(s) 38 may comprise a dedicated circuit configured to send and receive data at a given operating frequency. For example, the receiver controller(s) 38 may be or include a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 38), and/or may be another transceiver of or operatively associated with one or both of the electronic device 14 and the wireless receiver system 30, among other contemplated communication systems and/or apparatus. Further, in some examples, functions of the communications system 39 may be integrated with the receiver controller 38(*s*), such that the controller modifies the inductive field between the antennas 21, 31 to communicate in the frequency band of wireless power transfer operating frequency.

Figure 11:
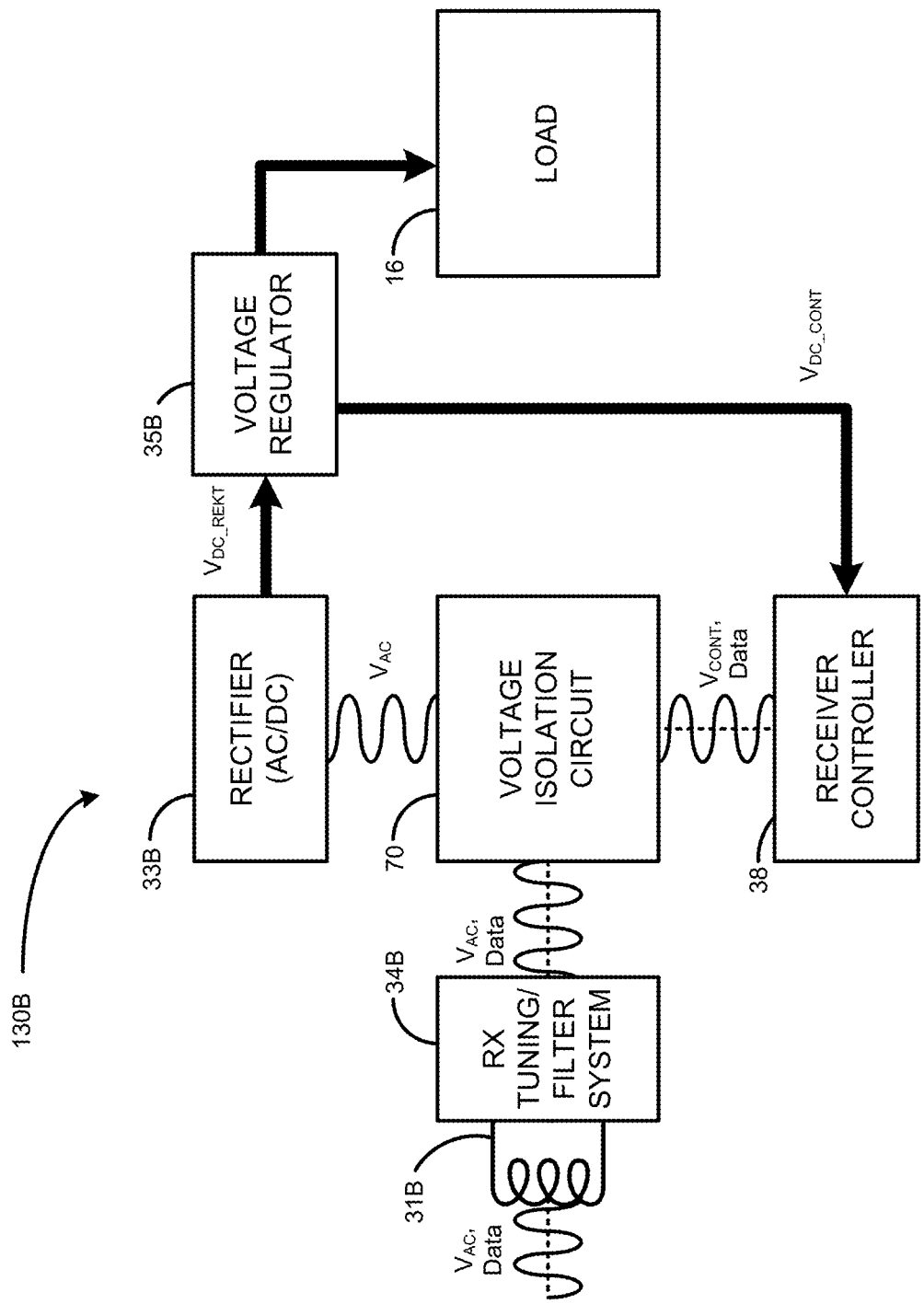
FIG. 11 is a block diagram of elements of a wireless receiver system of FIGS. 1-2 and 10, further illustrating components of an amplifier of the power conditioning system of FIG. 10 and signal characteristics for wireless power transmission, in accordance with FIGS. 1-2, 10, and the present disclosure.
Figure 12:
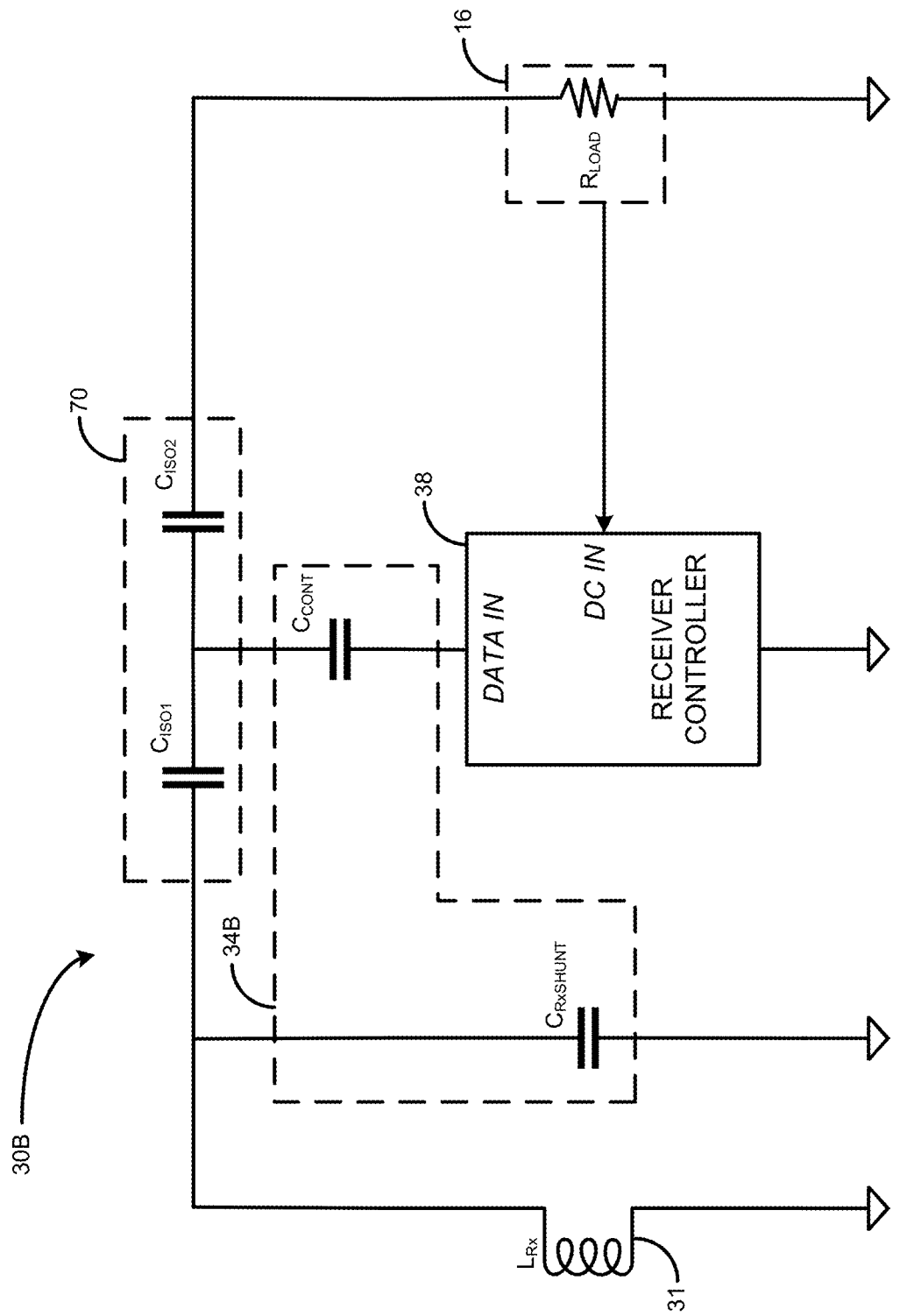
FIG. 12 is an electrical schematic diagram of elements of the wireless receiver system of FIG. 11, further illustrating components of an amplifier of the power conditioning system of FIGS. 10-11, in accordance with FIGS. 1-2, 10-11 and the present disclosure.

Turning now to FIGS. 11 and 12, the second receiver subsystem 120B is illustrated in further detail to show some example functionality of one or more of the receiver controller 38, the voltage isolation circuit 70, and the rectifier 33B. The block diagram of the wireless receiver system 30 illustrates one or more electrical signals and the conditioning of such signals, altering of such signals, transforming of such signals, rectifying of such signals, amplification of such signals, and combinations thereof. Similarly to FIG. 7, DC power signals are illustrated with heavily bolded lines, such that the lines are significantly thicker than other solid lines in FIG. 7 and other figures of the instant application, AC signals are illustrated as substantially sinusoidal wave forms with a thickness significantly less bolded than that of the DC power signal bolding, and data signals are represented as dotted lines. FIG. 12 illustrates sample electrical components for elements of the wireless transmission system, and subcomponents thereof, in a simplified form. Note that FIG. 12 may represent one branch or subsection of a schematic for the wireless receiver system 30B and/or components of the wireless receiver system 30B may be omitted from the schematic, illustrated in FIG. 12, for clarity.

As illustrated in FIG. 12, the receiver antenna 31B receives an actual AC wireless signal, which includes the AC power signal ($V_{AC}$) and the data signals (denoted as "Data" in FIG. 11), from the transmission antenna 21B of the wireless transmission system 20. (It should be understood an example of a transmitted AC power signal and data signal was previously shown in FIG. 7). $V_{AC}$ will be received at the rectifier 33B and/or the broader receiver power conditioning system 32B, wherein the AC wireless power signal is converted to a DC wireless power signal ($V_{DC\_REKT}$). $V_{DC\_REKT}$ is then provided to, at least, the load 16 that is operatively associated with the wireless receiver system 30. In some examples, $V_{DC\_REKT}$ is regulated by the voltage regulator 35B and provided as a DC input voltage ($V_{DC\_CONT}$) for the receiver controller 38. In some examples, such as the signal path shown in FIG. 11, the receiver controller 38 may be directly powered by the load 16. In some other examples, the receiver controller 38 need not be powered by the load 16 and/or receipt of $V_{DC\_CONT}$, but the receiver controller 38 may harness, capture, and/or store power from $V_{AC}$, as power receipt occurring in receiving, decoding, and/or otherwise detecting the data signals in-band of $V_{AC}$.

The receiver controller(s) 38 is configured to perform one or more of encoding the wireless data signals, decoding the wireless data signals, receiving the wireless data signals, transmitting the wireless data signals, and/or any combinations thereof. In examples, wherein the data signals are encoded and/or decoded as amplitude shift keyed (ASK) signals and/or OOK signals, the receiver controller(s) 38 may receive and/or otherwise detect or monitor voltage levels of $V_{AC}$ to detect in-band ASK and/or OOK signals. However, at higher power levels than those currently utilized in standard high frequency, NFMC communications and/or low power wireless power transmission, large voltages and/or large voltage swings at the input of a controller, such as the controller 38, may be too large for legacy microprocessor controllers to handle without disfunction or damage being done to such microcontrollers. Additionally, certain microcontrollers may only be operable at certain operating voltage ranges and, thus, when high frequency wireless power transfer occurs, the voltage swings at the input to such microcontrollers may be out of range or too wide of a range for consistent operation of the microcontroller.

For example, in some high frequency higher power wireless power transfer systems 10, when an output power from the second transmission subsystem 120B is greater than 1 W, voltage across the controller 38 may be higher than desired for the controller 38. Higher voltage, lower current configurations are often desirable, as such configurations may generate lower thermal losses and/or lower generated heat in the system 10, in comparison to a high current, low voltage transmission. To that end, the load 16 may not be a consistent load, meaning that the resistance and/or impedance at the load 16 may swing drastically during, before, and/or after an instance of wireless power transfer.

This is particularly an issue when the load 16 is a battery or other power storing device, as a fully charged battery has a much higher resistance than a fully depleted battery. For the purposes of this illustrative discussion, we will assume:

$$V_{AC\_MIN} = I_{AC\_MIN} * R_{LOAD\_MIN}, \text{ and}$$

$$P_{AC\_MIN} = I_{AC} * V_{LOAD\_MIN} = (I_{AC\_MIN})^2 * R_{LOAD\_MIN}$$

wherein $R_{LOAD\_MIN}$ is the minimum resistance of the load 16 (e.g., if the load 16 is or includes a battery, when the battery of the load 16 is depleted), $I_{AC\_MIN}$ is the current at $R_{LOAD\_MIN}$, $V_{AC\_MIN}$ is the voltage of $V_{AC}$ when the load 16 is at its minimum resistance and $P_{AC\_MI}N$ is the optimal power level for the load 16 at its minimal resistance. Further, we will assume:

$$V_{AC\_MAX} = I_{AC\_MAX} * R_{LOAD\_MAX}, \text{ and}$$

$$P_{AC\_MAX} = I_{AC\_MAX} * V_{LOAD\_MAX} = (I_{AC\_MAX})^2 * R_{LOAD\_MAX}$$

wherein $R_{LOAD\_MAX}$ is the maximum resistance of the load 16 (e.g., if the load 16 is depleted), $I_{AC\_MAX}$ is the current at $V_{AC}$ MAX, $V_{AC\_MAX}$ is the voltage of $V_{AC}$ when the load 16 is at its minimum resistance and $P_{AC\_MAX}$ is the optimal power level for the load 16 at its maximal resistance.

Accordingly, as the current is desired to stay relatively low, the inverse relationship between $I_{AC}$ and $V_{AC}$ dictate that the voltage range must naturally shift, in higher ranges, with the change of resistance at the load 16. However, such voltage shifts may be unacceptable for proper function of the controller 38. To mitigate these issues, the voltage isolation circuit 70 is included to isolate the range of voltages that can be seen at a data input and/or output of the controller 38 to an isolated controller voltage ($V_{CONT}$), which is a scaled version of $V_{AC}$ and, thus, comparably scales any voltage-based in-band data input and/or output at the controller 38. Accordingly, if a range for the AC wireless signal that is an unacceptable input range for the controller 38 is represented by $$V_{AC} = [V_{AC\_MIN}, V_{AC\_MAX}]$$

then the voltage isolation circuit 70 is configured to isolate the controller-unacceptable voltage range from the controller 38, by setting an impedance transformation to minimize the voltage swing and provide the controller with a scaled version of $V_{AC}$, which does not substantially alter the data signal at receipt. Such a scaled controller voltage, based on $V_{AC}$, is $V_{CONT}$, where $$V_{CONT} = [V_{CONT\_MIN}, V_{CONT\_MAX}].$$

While an altering load is one possible reason that an unacceptable voltage swing may occur at a data input of a controller, there may be other physical, electrical, and/or mechanical characteristics and/or phenomena that may affect voltage swings in $V_AC$, such as, but not limited to, changes in coupling (k) between the antennas 21, 31, detuning of the system(s) 10, 20, 30 due to foreign objects, proximity of another receiver system 30 within a common field area, among other things.

As best illustrated in FIG. 12, the voltage isolation circuit 70 includes at least two capacitors, a first isolation capacitor $C_{ISO1}$ and a second isolation capacitor $C_{ISO2}$. While only two series, split capacitors are illustrated in FIG. 12, it should also be understood that the voltage isolation circuit may include additional pairs of split series capacitors. $C_{ISO1}$ and $C_{ISO2}$ are electrically in series with one another, with a node therebetween, the node providing a connection to the data input of the receiver controller 38. $C_{ISO1}$ and $C_{ISO2}$ are configured to regulate $V_{AC}$ to generate the acceptable voltage input range $V_{CONT}$ for input to the controller. Thus, the voltage isolation circuit 70 is configured to isolate the controller 38 from $V_{AC}$, which is a load voltage, if one considers the rectifier 33B to be part of a downstream load from the receiver controller 38.

In some examples, the capacitance values are configured such that a parallel combination of all capacitors of the voltage isolation circuit 70 (e.g. $C_{ISO1}$ and $C_{ISO2}$) is equal to a total capacitance for the voltage isolation circuit ($C_{TOTAL}$). Thus, $$C_{ISO1} \| C_{ISO2} = C_{TOTAL},$$

wherein $C_{TOTAL}$ is a constant capacitance configured for the acceptable voltage input range for input to the controller. $C_{TOTAL}$ can be determined by experimentation and/or can be configured via mathematical derivation for a particular microcontroller embodying the receiver controller 38.

In some examples, with a constant $C_{TOTAL}$, individual values for the isolation capacitors $C_{ISO1}$ and $C_{ISO2}$ may be configured in accordance with the following relationships:

$$C_{ISO1} = \frac{C_{TOTAL} * (1 + t_v)}{t_v}, \text{ and}$$

$$C_{ISO2} = C_{TOTAL} * (1 + t_v).$$

wherein $t_v$ is a scaling factor, which can be experimentally altered to determine the best scaling values for $C_{ISO1}$ and $C_{ISO2}$, for a given system. Alternatively, $t_v$ may be mathematically derived, based on desired electrical conditions for the system. In some examples (which may be derived from experimental results), $t_v$ may be in a range of about 3 to about 10.

FIG. 12 further illustrates an example for the receiver tuning and filtering system 34, which may be configured for utilization in conjunction with the voltage isolation circuit 70. The receiver tuning and filtering system 34B of FIG. 12 includes a controller capacitor $C_{CONT}$, which is connected in series with the data input of the receiver controller 38. The controller capacitor is configured for further scaling of $V_{AC}$ at the controller, as altered by the voltage isolation circuit 70. To that end, the first and second isolation capacitors, as shown, may be connected in electrical parallel, with respect to the controller capacitor.

Additionally, in some examples, the receiver tuning and filtering system 34B includes a receiver shunt capacitor $C_{RxSHUNT}$, which is connected in electrical parallel with the receiver antenna 31. $C_{RxSHUNT}$ is utilized for initial tuning of the impedance of the wireless receiver system 30 and/or the broader system 10 for proper impedance matching and/or $C_{RxSHUNT}$ is included to increase the voltage gain of a signal received by the receiver antenna 31.

The wireless receiver system 30, utilizing the voltage isolation circuit 70, may have the capability to achieve proper data communications fidelity at greater receipt power levels at the load 16, when compared to other high frequency wireless power transmission systems. To that end, the wireless receiver system 30, with the voltage isolation circuit 70, is capable of receiving power from the wireless transmission system that has an output power at levels over 1 W of power, whereas legacy high frequency systems may be limited to receipt from output levels of only less than 1 W of power. For example, in legacy NFC-DC systems, the poller (receiver system) often utilizes a microprocessor from the NTAG family of microprocessors, which was initially designed for very low power data communications. NTAG microprocessors, without protection or isolation, may not adequately and/or efficiently receive wireless power signals at output levels over 1 W. However, inventors of the present application have found, in experimental results, that when utilizing voltage isolation circuits as disclosed herein, the NTAG chip may be utilized and/or retrofitted for wireless power transfer and wireless communications, either independently or simultaneously.

To that end, the voltage isolation circuits disclosed herein may utilize inexpensive components (e.g., isolation capacitors) to modify functionality of legacy, inexpensive microprocessors (e.g., an NTAG family microprocessor), for new uses and/or improved functionality. Further, while alternative controllers may be used as the receiver controller 38 that may be more capable of receipt at higher voltage levels and/or voltage swings, such controllers may be cost prohibitive, in comparison to legacy controllers. Accordingly, the systems and methods herein allow for use of less costly components, for high power high frequency wireless power transfer.

Figure 13A:
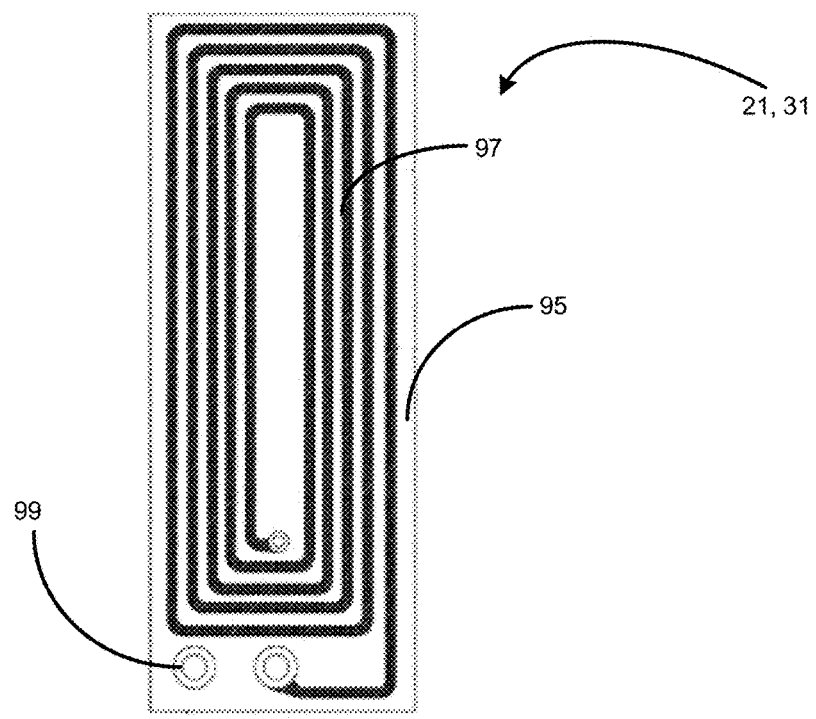
FIG. 13A is a top view of a non-limiting, exemplary antenna, for use as one or both of a transmission antenna and a receiver antenna of the system of FIGS. 1-8, 9-12 and/or any other systems, methods, or apparatus disclosed herein, in accordance with the present disclosure.

FIG. 13A illustrates an example, non-limiting embodiment of one or more of the transmitter antennas 21 and/or the receiver antennas 31, which may be used with any of the systems, methods, and/or apparatus disclosed herein. In the illustrated embodiment, the antenna 21, 31 is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; U.S. Pat. No. 9,941,590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference. The antenna 21, 31 illustrated in FIG. 13A is a printed circuit board (PCB) or flexible printed circuit board (FPC) antenna, having a plurality of turns 97 of a conductor and one or more connectors 99, all disposed on a substrate 95 of the antenna 21, 31. While the antenna 21, 31 is illustrated, in FIG. 13A, having a certain number of turns and/or layers, the PCB or FPC antenna may include any number of turns or layers. The PCB or FPC antenna 21, 31 of FIG. 13A may be produced via any known method of manufacturing PCB or FPCs known to those skilled in the art.

Figure 13B:
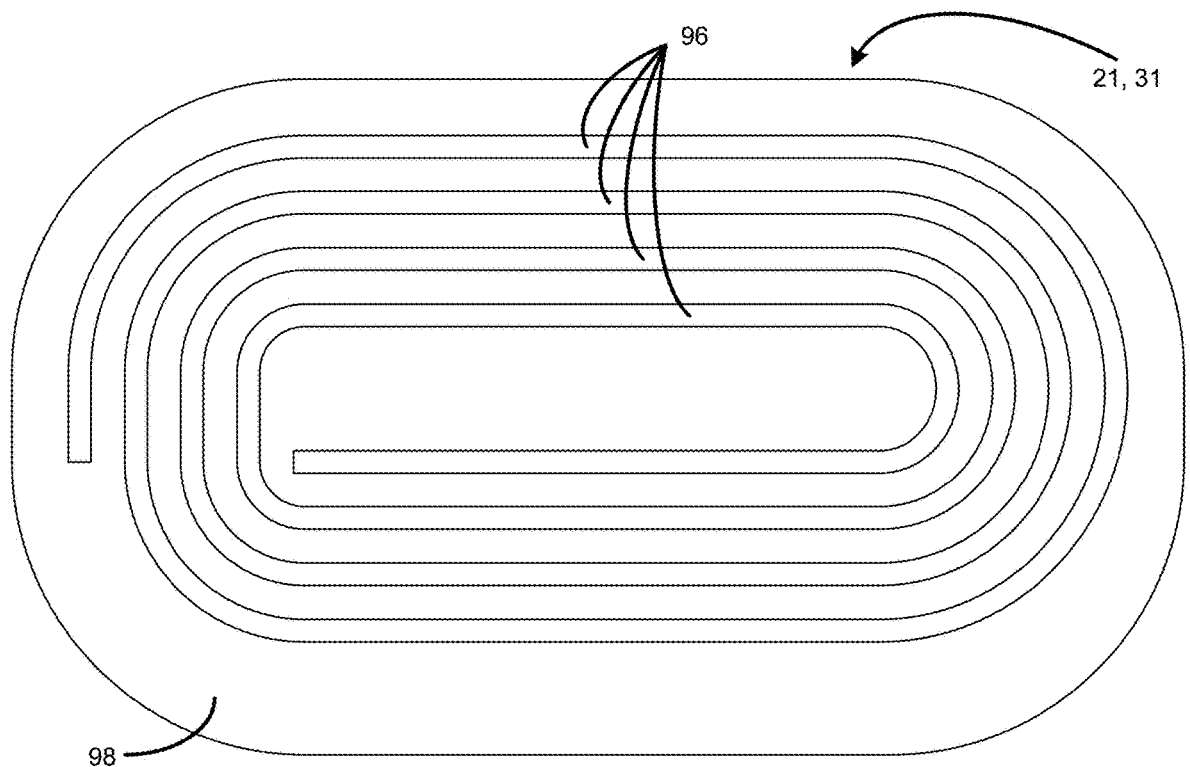
FIG. 13B is a top view of another non-limiting, exemplary antenna, for use as one or both of a transmission antenna and a receiver antenna of the system of FIGS. 1-8, 9-12 and/or any other systems, methods, or apparatus disclosed herein, in accordance with the present disclosure.

In another embodiment of the antennas 21, 31, illustrated in FIG. 13B, the antenna 21, 31 may be a wire wound antenna, wherein the antenna is a conductive wire wound in a particular pattern and having any number of turns 96. The wire wound antenna 21, 31 may be free standing within an associated structure or, in some examples, the wire wound antenna 21, 31 may be either held in place or positioned using a wire holder 98.

In addition, the antennas 21, 31 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 21, 31 may be any antenna capable of the aforementioned higher power, high frequency wireless power transfer.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "of" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:
1. A wireless power transmitter comprising:
an inverter that is operable to (i) receive, as input, a direct current (DC) voltage signal having a voltage level and a drive signal having an operating frequency and (ii) produce an alternating current (AC) signal based on the DC voltage signal and the drive signal that are provided as input to the inverter;

a tuning circuit that is operable to (i) receive the AC signal that is produced by the inverter and (ii) tune the AC signal;
a transmission antenna that is operable to emit an alternating electromagnetic field in accordance with the AC signal that is produced by the inverter and tuned by the tuning circuit; and
at least one processor;
at least one non-transitory machine-readable medium; and
executable code stored on the at least one non-transitory machine-readable medium that, when executed by the at least one processor, causes the wireless power transmitter to:
  detect a presence of a wireless power receiver that is couplable with the wireless power transmitter;
  after detecting the presence of the wireless power receiver, begin engaging in a period of wireless power transfer with the wireless power receiver during which the wireless power transmitter emits, via the transmission antenna, an alternating electromagnetic field that delivers a wireless power signal to the wireless power receiver;
  while engaging in the period of wireless power transfer with the wireless power receiver:
    determine whether a foreign object has been inserted into the alternating electromagnetic field that delivers the wireless power signal to the wireless power receiver by:
      detecting that a given amount of time has elapsed since a prior reference point during the period of wireless power transfer with the wireless power receiver; and
      in response to detecting that the given amount of time has elapsed since the prior reference point, (i) temporarily stopping emission of the alternating electromagnetic field that delivers the wireless power signal to the wireless power receiver for a temporary interval of time during the period of wireless power transfer with the wireless power receiver and (ii) after the wireless power transmitter has temporarily stopped emission of the alternating electromagnetic field that delivers the wireless power signal to the wireless power receiver, performing a foreign object detection (FOD) process during the temporary interval of time; and
    after the FOD process is completed and the temporary interval of time has ended, resume emission of the alternating electromagnetic field that delivers the wireless power signal to the wireless power receiver during the period of wireless power transfer with the wireless power receiver.

2. The wireless power transmitter of claim 1, further comprising executable code stored on the at least one non-transitory machine-readable medium that, when executed by the at least one processor, causes the wireless power transmitter to:
  while performing the FOD process, determine that a foreign object is present; and
  based on determining that the foreign object is present, modify the wireless power transmitter's operation during the resumed emission of the alternating electromagnetic field that delivers the wireless power signal to the wireless power receiver during the period of wireless power transfer with the wireless power receiver.

3. The wireless power transmitter of claim 1, wherein performing the FOD process comprises:
  performing an analysis of a quality factor (Q) of the transmission antenna; and
  based on the analysis of the quality factor (Q), determining whether any foreign object is present.

4. The wireless power transmitter of claim 3, wherein performing the analysis of the quality factor (Q) of the transmission antenna comprises:
  comparing a current value of the quality factor (Q) of the transmission antenna to a baseline value of the quality factor (Q) of the transmission antenna.

5. The wireless power transmitter of claim 3, wherein performing the FOD process further comprises:
  emitting one or more pings of wireless power signals.

6. The wireless power transmitter of claim 3, wherein performing the FOD process further comprises:
  performing an analysis of an impedance of the transmission antenna.

7. The wireless power transmitter of claim 1, further comprising:
  a voltage regulator that is operable to (i) receive a supply DC voltage signal from a power supply and (ii) based on the supply DC voltage signal, produce the DC voltage signal that is provided as input to the inverter.

8. The wireless power transmitter of claim 1, wherein the operating frequency of the drive signal comprises an operating frequency defined by a Qi standard.

9. The wireless power transmitter of claim 1, wherein the executable code that, when executed by the at least one processor, causes the wireless power transmitter to detect the presence of the wireless power receiver that is couplable with the wireless power transmitter comprises executable code that, when executed by the at least one processor, causes the wireless power transmitter to:
  detect a presence of an object; and
  after detecting the presence of the object, determine that the object comprises the wireless power receiver that is couplable with the wireless power transmitter.

10. The wireless power transmitter of claim 1, wherein the tuning circuit comprises at least two capacitors.

11. A method of operating a wireless power transmitter comprising (i) an inverter that is operable to produce an alternating current (AC) signal based on a direct current (DC) voltage signal having a voltage level and a drive signal having an operating frequency that are provided as input to the inverter, (ii) a tuning circuit that is operable to tune the AC signal, and (iii) a transmission antenna that is operable to emit an alternating electromagnetic field in accordance with the AC signal that is produced by the inverter and tuned by the tuning circuit, the method comprising:
  detecting a presence of a wireless power receiver that is couplable with the wireless power transmitter;
  after detecting the presence of the wireless power receiver, beginning to engage in a period of wireless power transfer with the wireless power receiver during which the wireless power transmitter emits, via the transmission antenna, an alternating electromagnetic field that delivers a wireless power signal to the wireless power receiver;
  while engaging in the period of wireless power transfer with the wireless power receiver:
    determining whether a foreign object has been inserted into the alternating electromagnetic field that delivers the wireless power signal to the wireless power receiver by:

detecting that a given amount of time has elapsed since a prior reference point during the period of wireless power transfer with the wireless power receiver; and in response to detecting that the given amount of time has elapsed since the prior reference point, (i) temporarily stopping emission of the alternating electromagnetic field that delivers the wireless power signal to the wireless power receiver for a temporary interval of time during the period of wireless power transfer with the wireless power receiver and (ii) after the wireless power transmitter has temporarily stopped emission of the alternating electromagnetic field that delivers the wireless power signal to the wireless power receiver, performing a foreign object detection (FOD) process during the temporary interval of time; and after the FOD process is completed and the temporary interval of time has ended, resuming emission of the alternating electromagnetic field that delivers the wireless power signal to the wireless power receiver during the period of wireless power transfer with the wireless power receiver.

12. The method of claim 11, further comprising:
based on the FOD process, determining that a foreign object is present; and
in response to determining that the foreign object is present, modifying the wireless power transmitter's operation during the resumed emission of the alternating electromagnetic field that delivers the wireless power signal to the wireless power receiver during the period of wireless power transfer with the wireless power receiver.

13. The method of claim 11, wherein performing the FOD process comprises:
performing an analysis of a quality factor (Q) of the transmission antenna; and
based on the analysis of the quality factor (Q), determining whether any foreign object is present.

14. The method of claim 13, wherein performing the analysis of the quality factor (Q) of the transmission antenna comprises:
comparing a current value of the quality factor (Q) of the transmission antenna to a baseline value of the quality factor (Q) of the transmission antenna.

15. The method of claim 13, wherein performing the FOD process comprises:
emitting one or more pings of wireless power signals.

16. The method of claim 13, wherein performing the FOD process comprises:
performing an analysis of an impedance of the transmission antenna.

17. The method of claim 11, wherein the operating frequency of the drive signal comprises an operating frequency defined by a Qi standard.

18. The method of claim 11, wherein detecting the presence of the wireless power receiver that is couplable with the wireless power transmitter comprises:
detecting a presence of an object; and
after detecting the presence of the object, determining that the object comprises the wireless power receiver that is couplable with the wireless power transmitter.

19. A wireless power transmitter comprising:
a voltage regulator that is operable to (i) receive a supply direct current (DC) voltage signal from a power supply and (ii) based on the supply DC voltage signal, produce a DC voltage signal having a given voltage level;
an inverter that is operable to (i) receive, as input, the DC voltage signal produced by the voltage regulator and a drive signal having a given operating frequency defined by a Qi standard, and (ii) produce an alternating current (AC) signal based on the DC voltage signal and the drive signal that are provided as input to the inverter;
a tuning circuit that is operable to (i) receive the AC signal that is produced by the inverter and (ii) tune the AC signal, wherein the tuning circuit comprises at least two capacitors;
a transmission antenna that is operable to emit an alternating electromagnetic field in accordance with the AC signal that is produced by the inverter and tuned by the tuning circuit; and
at least one processor;
at least one non-transitory machine-readable medium; and
executable code stored on the at least one non-transitory machine-readable medium that, when executed by the at least one processor, causes the wireless power transmitter to:
detect a presence of a wireless power receiver that is couplable with the wireless power transmitter;
after detecting the presence of the wireless power receiver, begin engaging in a period of wireless power transfer with the wireless power receiver during which the wireless power transmitter emits, via the transmission antenna, an alternating electromagnetic field that delivers a wireless power signal to the wireless power receiver;
while engaging in the period of wireless power transfer with the wireless power receiver:
determine whether a foreign object has been inserted into the alternating electromagnetic field that delivers the wireless power signal to the wireless power receiver by:
detecting that a given amount of time has elapsed since a prior reference point during the period of wireless power transfer with the wireless power receiver;
in response to detecting that the given amount of time has elapsed since the prior reference point, (i) temporarily stopping emission of the alternating electromagnetic field that delivers the wireless power signal to the wireless power receiver for a temporary interval of time during the period of wireless power transfer with the wireless power receiver and (ii) after the wireless power transmitter has temporarily stopped emission of the alternating electromagnetic field that delivers the wireless power signal to the wireless power receiver, performing a foreign object detection (FOD) process during the temporary interval of time by:
emitting one or more pings of wireless power signals; and
performing an analysis of a quality factor (Q) of the transmission antenna by comparing a current value of the quality factor (Q) of the transmission antenna to a baseline value the quality factor (Q) of the transmission antenna;
while performing the FOD process, determine that a foreign object is present; and
after the FOD process is completed and the temporary interval of time has ended, resume emission of the alternating electromagnetic field that delivers the wireless power signal to the wireless power receiver during the period of wireless power transfer with the wireless power receiver but modify the wireless power transmitter's operation during the resumed emission of the alternating electromagnetic field that delivers the wireless power signal to the wireless power receiver during the period of wireless power transfer with the wireless power receiver based on determining that the foreign object is present.

20. The wireless power transmitter of claim 19, wherein the FOD process further involves performing an analysis of an impedance of the transmission antenna.

* * * * *